United States Patent
Shinjo

(10) Patent No.: US 10,464,150 B2
(45) Date of Patent: Nov. 5, 2019

(54) CUTTING INSERT HAVING END SURFACE WITH SIDE EDGES CONNECTED BY AN INCLINED RAKE SURFACE AND CUTTING TOOL

(71) Applicant: Tungaloy Corporation, Fukushima (JP)

(72) Inventor: Yuji Shinjo, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 226 days.

(21) Appl. No.: 15/386,658

(22) Filed: Dec. 21, 2016

(65) Prior Publication Data

US 2017/0182573 A1    Jun. 29, 2017

(30) Foreign Application Priority Data

Dec. 24, 2015  (JP) ................ 2015-251911

(51) Int. Cl.
  *B23C 5/20* (2006.01)
  *B23F 21/16* (2006.01)
  *B23C 5/22* (2006.01)

(52) U.S. Cl.
  CPC ........... *B23F 21/166* (2013.01); *B23C 5/207* (2013.01); *B23C 5/2273* (2013.01); *B23C 2200/0433* (2013.01); *B23C 2200/0438* (2013.01); *B23C 2200/081* (2013.01); *B23C 2200/085* (2013.01); *B23C 2200/286* (2013.01); *B23C 2270/16* (2013.01)

(58) Field of Classification Search
  CPC ...... B23C 2200/0433; B23C 2200/081; B23C 2200/085; B23C 2200/286; B23C 2270/16; B23C 5/207; B23C 5/2273; B23C 2200/048; B23F 21/166
  See application file for complete search history.

(56) References Cited

U.S. PATENT DOCUMENTS

| | | | |
|---|---|---|---|
| 3,548,473 A | 12/1970 | Stein | |
| 4,449,864 A | 5/1984 | Haque et al. | |
| 4,856,942 A * | 8/1989 | Bernadic | B23B 27/143 407/114 |
| 5,593,255 A * | 1/1997 | Satran | B23C 5/109 407/113 |
| 5,893,683 A * | 4/1999 | Johnson | B23C 5/109 407/113 |
| 6,499,917 B1 | 12/2002 | Parker et al. | |

(Continued)

FOREIGN PATENT DOCUMENTS

| | | |
|---|---|---|
| JP | 1986 S61-064927 U | 5/1986 |
| JP | 1990 H02-066903 U | 5/1990 |

(Continued)

*Primary Examiner* — Sara Addisu
(74) *Attorney, Agent, or Firm* — Studebaker & Brackett PC

(57) ABSTRACT

A cutting insert has a first end surface and a second end surface which are opposed to each other. The first end surface has at least one apex and two side edges which extend so as to sandwich the apex. At least part of the two side edges serves as a cutting edge. The first end surface has a rake surface which is connected to the cutting edge. As viewed in a cross-section which intersects with the two side edges and which is orthogonal to the second end surface, the rake surface is inclined relative to the second end surface.

19 Claims, 23 Drawing Sheets

(56) References Cited

U.S. PATENT DOCUMENTS

| | | | |
|---|---|---|---|
| 2004/0005199 A1* | 1/2004 | Janness | B23B 51/048 |
| | | | 407/35 |
| 2006/0133901 A1 | 6/2006 | Hackman | |
| 2012/0207553 A1 | 8/2012 | Sjoo et al. | |
| 2014/0212227 A1* | 7/2014 | Bitner | B23C 5/207 |
| | | | 407/40 |
| 2017/0014922 A1* | 1/2017 | Ellicott | B23F 21/066 |
| 2017/0209935 A1* | 7/2017 | Furusawa | B23B 27/14 |

FOREIGN PATENT DOCUMENTS

| | | | | |
|---|---|---|---|---|
| JP | 11179611 A | * | 7/1999 | B23C 5/2221 |
| JP | 5751401 B1 | * | 7/2015 | B23C 5/109 |
| JP | WO 2015129769 A1 | * | 9/2015 | B23C 5/06 |

\* cited by examiner

CUTTING INSERT HAVING END SURFACE WITH SIDE EDGES CONNECTED BY AN INCLINED RAKE SURFACE AND CUTTING TOOL

RELATED APPLICATIONS

Priority is claimed to JP 2015-251911 filed Dec. 24, 2015. The contents of the aforementioned application are incorporated by reference in their entirety.

TECHNICAL FIELD

The present invention relates to a cutting insert and a cutting tool comprising such cutting insert.

BACKGROUND ART

As a formed cutting tool, in particular, as a cutting tool for forming, for example, the teeth of a gear, a hob comprising a plurality of cutting inserts is known. Such cutting inserts have formed cutting edges. Further, such cutting inserts are removably mounted on a tool body of the hob. In such indexable hob, when a cutting edge is damaged, the relevant cutting insert may be replaced or the direction of the cutting insert may be changed so as to allow another cutting edge to be used. This eliminates the need to replace the entire tool. Such type of cutting insert is economically excellent and the machining can be restarted immediately, and therefore, it has frequently been used, in recent years, in manufacturing sites where productivity is strictly required.

Patent Document 1 discloses an example of such indexable hob. Such hob comprises a plurality of cutting inserts having the same shape. The plurality of cutting inserts is arranged in a helical manner on a peripheral side surface of a tool body having a substantially cylindrical shape. Each cutting insert is arranged such that a helix lead direction thereof and a rake surface thereof intersect with each other in a perpendicular manner.

CITATION LIST

Patent Document

Patent Document 1: JP2012-166336 A

SUMMARY

Technical Problem

In the cutting tool disclosed in Patent Document 1, a plurality of cutting inserts having the same shape is arranged in a helical manner. Insert mounting parts on which such cutting inserts are mounted are also arranged in a helical manner. Further, the respective insert mounting parts differ from one another in not only their positions but also their circumferential angles. A hob, in particular, employs a large number of cutting inserts and is accordingly provided with a large number of insert mounting parts. A long machining time is required to form these insert mounting parts in a tool body of a cutting tool. Further, in order to form, through cutting, a large number of insert mounting parts with angles slightly different from one another, it is necessary to place a rotary index table on a table of a machine tool or to use a 5-axis machining center. Such rotary index table allows angle adjustment for rotary indexing to be conducted freely. Further, such 5-axis machining center allows an inclination angle of a tool axis of a machine tool to be adjusted freely. However, whichever method is employed for the cutting of insert mounting parts, the machining position accuracy is prone to deterioration since the number of rotational axes, being control axes, which can be controlled freely, is increased by one. Further, the rigidity, etc., of the machine tool will be deteriorated, whereby the cutting conditions are limited, which is prone to invite increased manufacturing cost.

The present invention has been made in light of the above problem, and an object of the present invention is to provide a cutting insert and a cutting tool which achieve cutting with high accuracy and allow the manufacturing cost to be suppressed.

Solution to Problem

A cutting insert according to the present invention has: a first end surface and a second end surface which are opposed to each other; and a peripheral side surface which connects the first end surface and the second end surface. As viewed from a direction facing the first end surface, the first end surface has at least one apex and two side edges which extend so as to sandwich the apex. At least part of the two side edges serves as a cutting edge. The first end surface has a rake surface which is connected to the cutting edge. As viewed in a cross-section which intersects with the two side edges and which is orthogonal to the second end surface, the rake surface is inclined relative to the second end surface.

Another cutting tool according to the present invention comprises the cutting insert according to the present invention and a tool body. The tool body has a substantially cylindrical shape having two substantially circular end surfaces and a peripheral side surface which connects the end surfaces. A plurality of the cutting inserts is mounted, on the peripheral side surface of the tool body, so as to be arranged in a helical manner, heading from one of the end surfaces to the other end surface. In a side view, the cutting insert is placed so as to be substantially parallel to a rotational axis serving as a rotation center of the tool body. An inclination angle of the rake surface of the cutting insert is the same as a lead angle of a helix formed by a plurality of the cutting inserts.

Another cutting tool according to the present invention comprises the cutting insert according to the present invention and a tool body. The tool body has a substantially cylindrical shape having two substantially circular end surfaces and a peripheral side surface which connects the end surfaces. A plurality of the apexes of a plurality of the cutting inserts is arranged in a helical manner on the peripheral side surface of the tool body, heading from one of the end surfaces to the other end surface. A longitudinal direction of the cutting insert is arranged so as to be substantially parallel to a rotational axis serving as a rotation center of the tool body. An inclination angle of each of the rake surfaces of the cutting insert is the same as a lead angle of a helix formed by a plurality of the apexes.

Advantageous Effects of Invention

According to the present invention, the cutting insert and the cutting tool can be provided which achieve cutting with high accuracy and allow the manufacturing cost to be suppressed.

DESCRIPTION OF EMBODIMENTS

Embodiments will now be described in detail with reference to the attached drawings. Expressions such as "upper," "lower," "right," "left," "front" and "back" may be used in the following description. However, such expressions are merely used to aid in easier understanding of the description and are not intended to limit the scope of the present invention.

Figure 1:
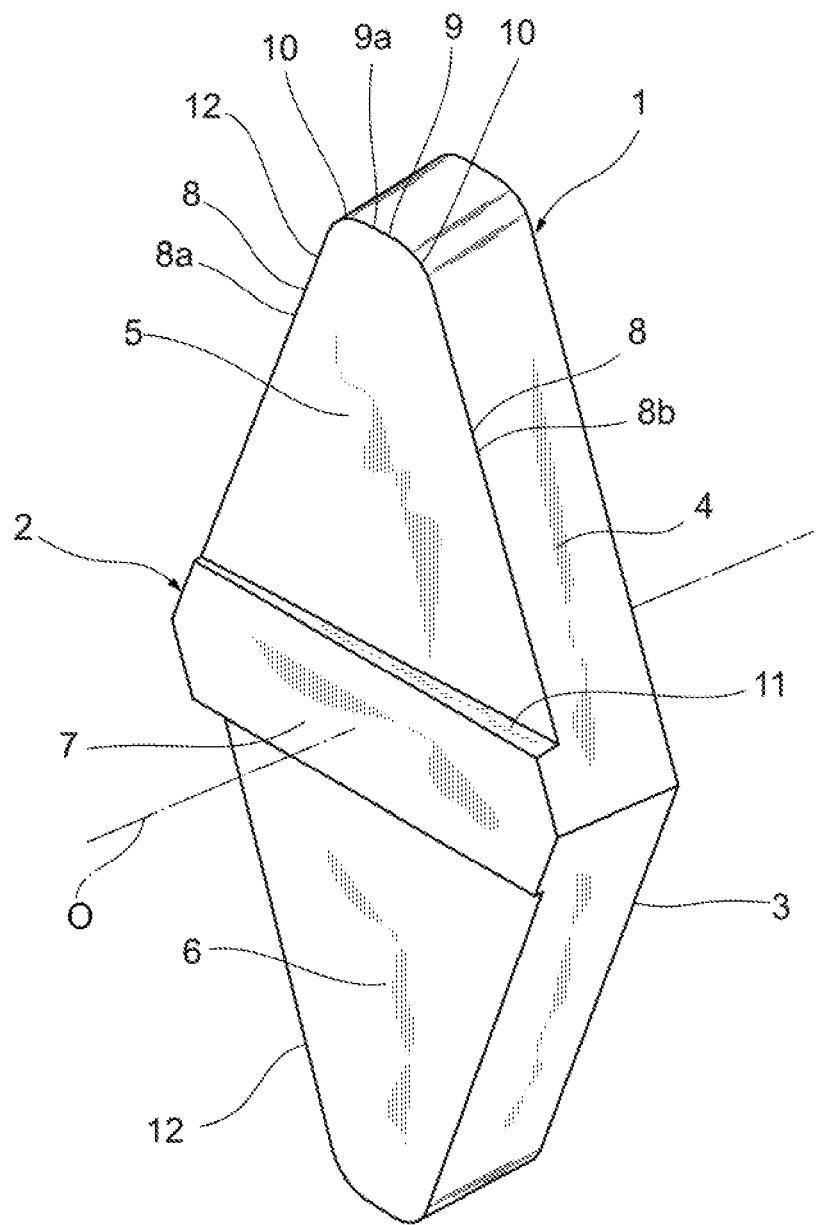
FIG. 1 is a perspective view showing a cutting insert according to a first embodiment.
Figure 2:
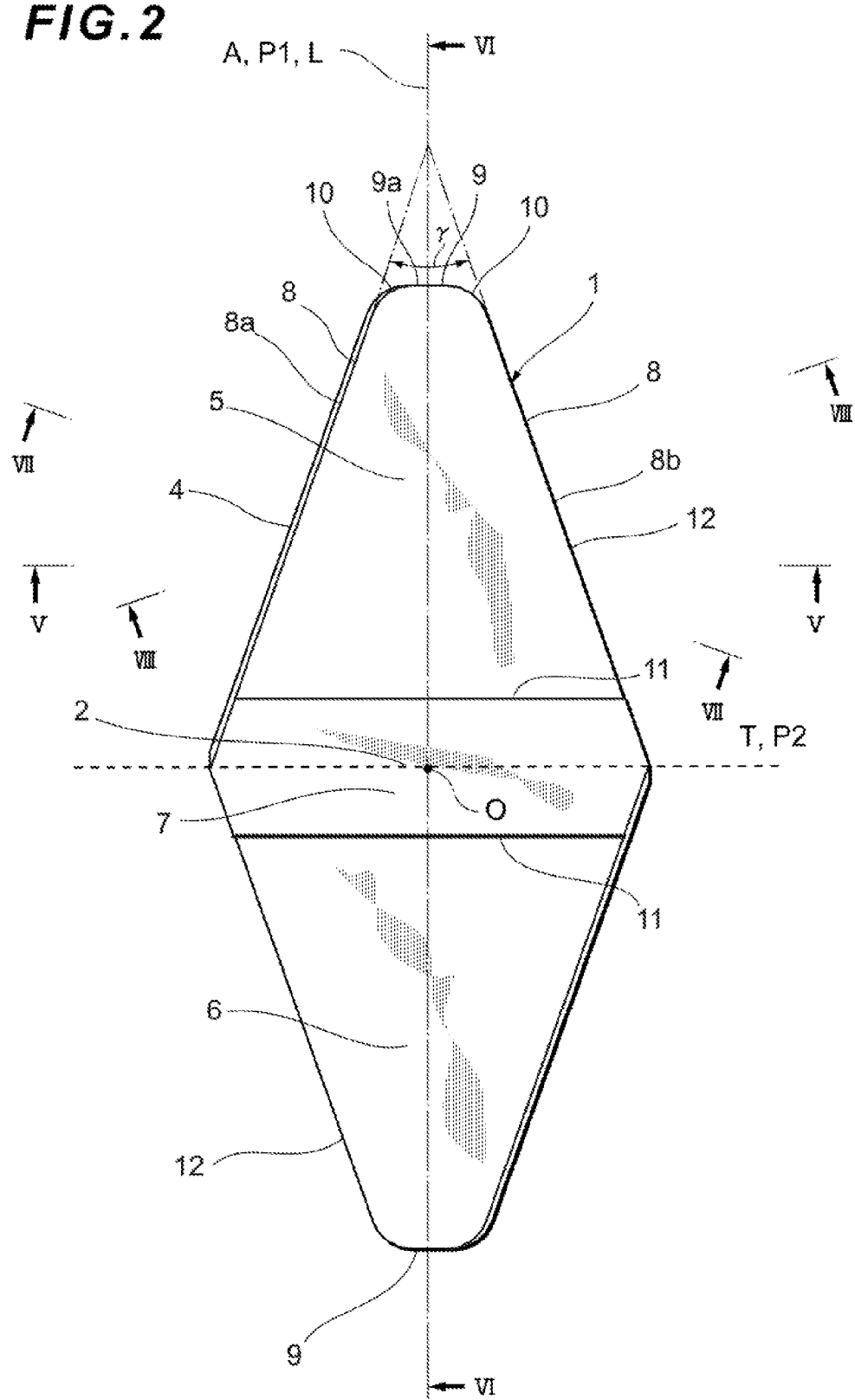
FIG. 2 is a plan view showing the cutting insert of FIG. 1.
Figure 3:
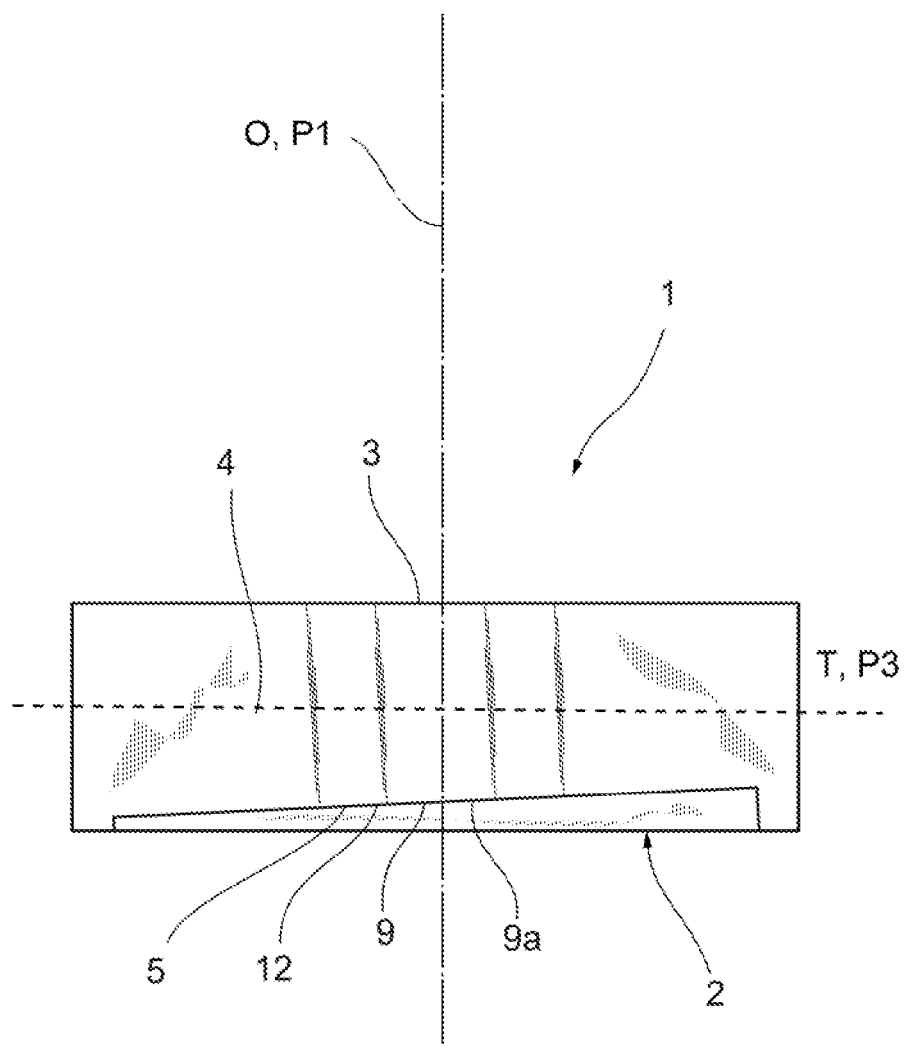
FIG. 3 is a back view showing the cutting insert of FIG. 1.
Figure 4:
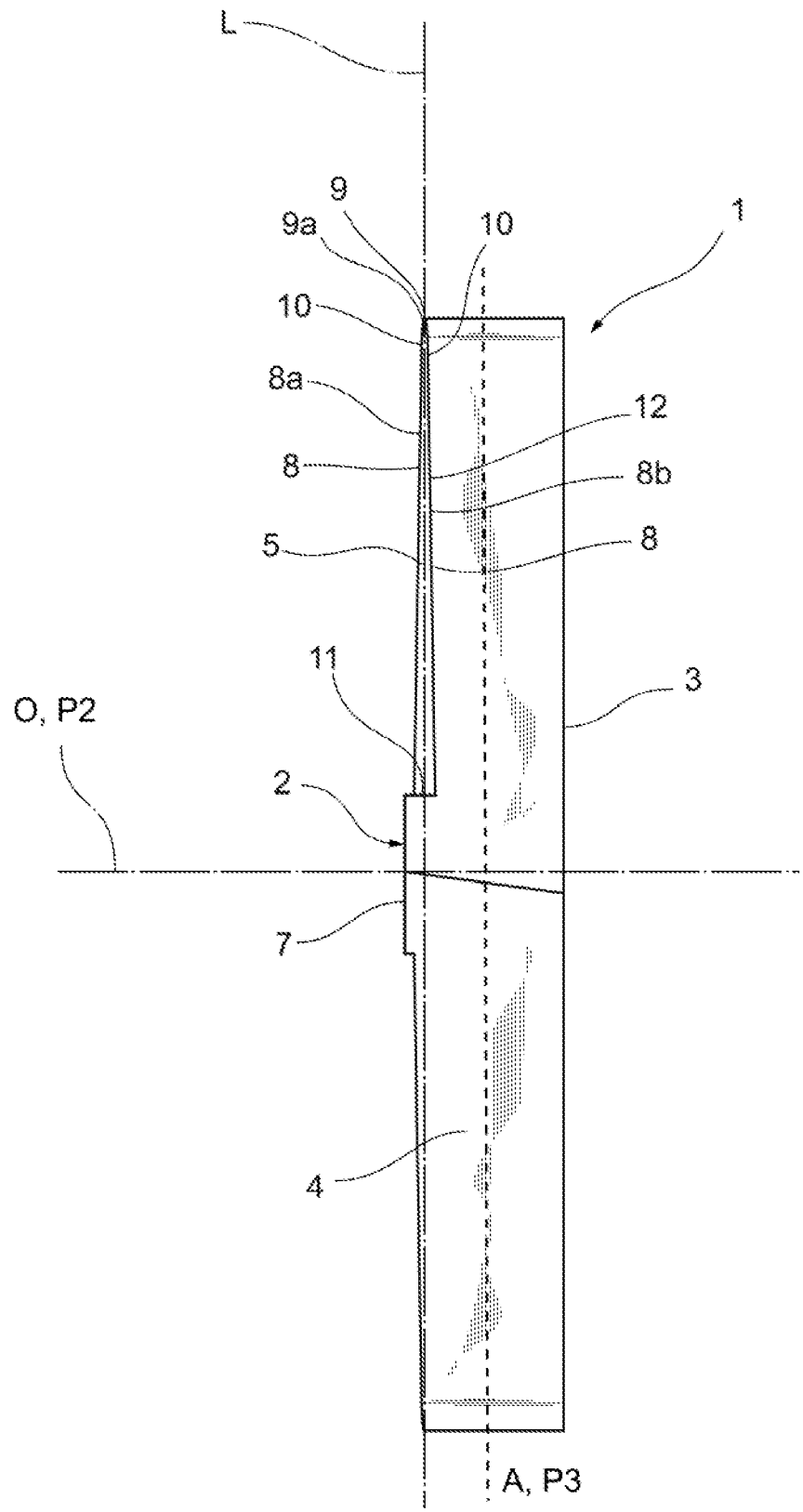
FIG. 4 is a right side view showing the cutting insert of FIG. 1.

Firstly, a cutting insert 1 according to a first embodiment will be described with reference to FIGS. 1 to 8. As shown in FIGS. 1 to 3, the contour shape of the cutting insert 1 has a plate shape.

The cutting insert 1 has a first end surface 2 (or "top surface"), a second end surface 3 (or "bottom surface") and a peripheral side surface 4. The first end surface 2 has a substantially quadrangular shape. The second end surface 3 is arranged so as to be opposed to the first end surface 2. The peripheral side surface 4 connects the first end surface 2 and the second end surface 3. A central axis O is defined so as to penetrate substantially a center part of the first end surface 2 and substantially a center part of the second end surface 3. The cutting insert 1 is configured so as to be of 180-degree rotational symmetry about the central axis O. The cutting insert 1 has a longitudinal axis A which extends along the longest dimension of the insert and lies on a longitudinal plane P1 which is perpendicular to the second end surface 3. The cutting insert 1 has a transverse axis T which extends along the widest dimension of the insert 1 and lies on a lateral plane P2 which is also perpendicular to the second end surface 3. The transverse axis T intersects the longitudinal axis A at a right angle and is perpendicular to the longitudinal plane P1. The intersection of the longitudinal axis A and the transverse axis T defines a third plane P3 which is parallel to the second end surface 3. The longitudinal axis A intersects the central axis O, with both of these axes lying on the longitudinal plane P1.

As shown in FIGS. 1 and 2, the first end surface 2 has a rake surface 5, a minor rake surface 6 and a contact surface 7. The rake surface 5 has a substantially triangular shape. The minor rake surface 6 has a shape of 180-degree rotational symmetry with respect to the rake surface 5. The contact surface 7 is arranged between the rake surface 5 and the minor rake surface 6. The rake surface 5 can be considered to have a substantially trapezoidal shape. The rake surface 5 has a short side 9 and two long sides 8 which are arranged so as to sandwich the short side 9. The two long sides 8 share substantially the same length. The long sides 8 and the short side 9 respectively have substantially linear shapes. Connecting parts 10 between the short side 9 and the respective long sides 8 respectively have smoothly curved shapes. As shown in FIG. 2, the two long sides 8 are arranged such that an interior angle γ formed by extensions of such long sides 8 is an acute angle. Each of the rake surface 5, the minor rake surface 6 and the contact surface 7 is a substantially flat surface. An intersecting edge between the rake surface 5 and the peripheral side surface 4 serves as a cutting edge 12. Similarly, an intersecting edge between the minor rake surface 6 and the peripheral side surface 4 serves as another cutting edge 12. The rake surface 5 and the minor rake surface 6 are respectively connected to the contact surface 7 via connecting surfaces 11. It should be noted that, since the minor rake surface 6 is the same as the rake surface 5, the description thereof will be omitted here except where particularly necessary.

As the rake surface 5 is viewed from a direction facing the rake surface 5 (i.e., a direction of a normal of the rake surface 5), the rake surface 5 has, in general, a bilaterally symmetrical shape. As shown in FIG. 2, also as viewed from a direction facing the first end surface 2, the rake surface 5 has, in general, a bilaterally symmetrical shape. In further detail, the rake surface 5 is, in a plan view, shaped such that right and left parts thereof are, in general, bilaterally symmetric with respect to a reference line L which lies on longitudinal plane P1. Herein, the reference line L is a line which passes through a center part of the short side 9 and which intersects with the short side 9 in a perpendicular manner. To put it another way, in a plan view, the rake surface 5 has, in general, a line symmetrical shape with respect to a bisector L of the interior angle γ of the extensions of the respective long sides 8. The rake surface 5 and the minor rake surface 6 are arranged such that each short side 9 thereof is located on the outermost side of the cutting insert 1. Therefore, such short side 9 can be referred to as an apex 9a. The rake surface 5, the minor rake surface 6 and the contact surface 7 of the first end surface 2 are not located on the same plane, and this will be described below in detail. Meanwhile, as shown in FIG. 3, the second end surface 3, which opposes the first end surface 2, is entirely a flat surface. In the present embodiment, the long sides 8 and the short side 9 all have substantially linear shapes, but the present invention is not limited thereto. In the present invention, if the need arises, the long sides 8 and the short side 9 may each be changed so as to have a curved shape like an involute curve or a shape obtained by combining linear shapes and curved shapes. Further, a portion which extends from a cutting edge and which is not involved in cutting (i.e., an edge portion which is not used as a cutting edge) may have any shape.

As shown in FIG. 3, in the cutting insert 1, the contact surface 7 of the first end surface 2 is parallel to the second end surface 3. However, the rake surface 5 and the minor rake surface 6 (not shown in FIG. 3) are not parallel to the second end surface 3. In other words, the rake surface 5 and the minor rake surface 6 are inclined relative to the second end surface 3. The rake surface 5 and the minor rake surface 6 are each a surface obtained by rotating a surface which is parallel to the second end surface 3 around the above-described reference line L by a predetermined angle. Therefore, in the rake surface 5, the distances from the contact surface 7 in a thickness direction of the cutting insert 1 (i.e., a direction along the central axis O) differ between a long side 8a and a long side 8b.

Figure 5:
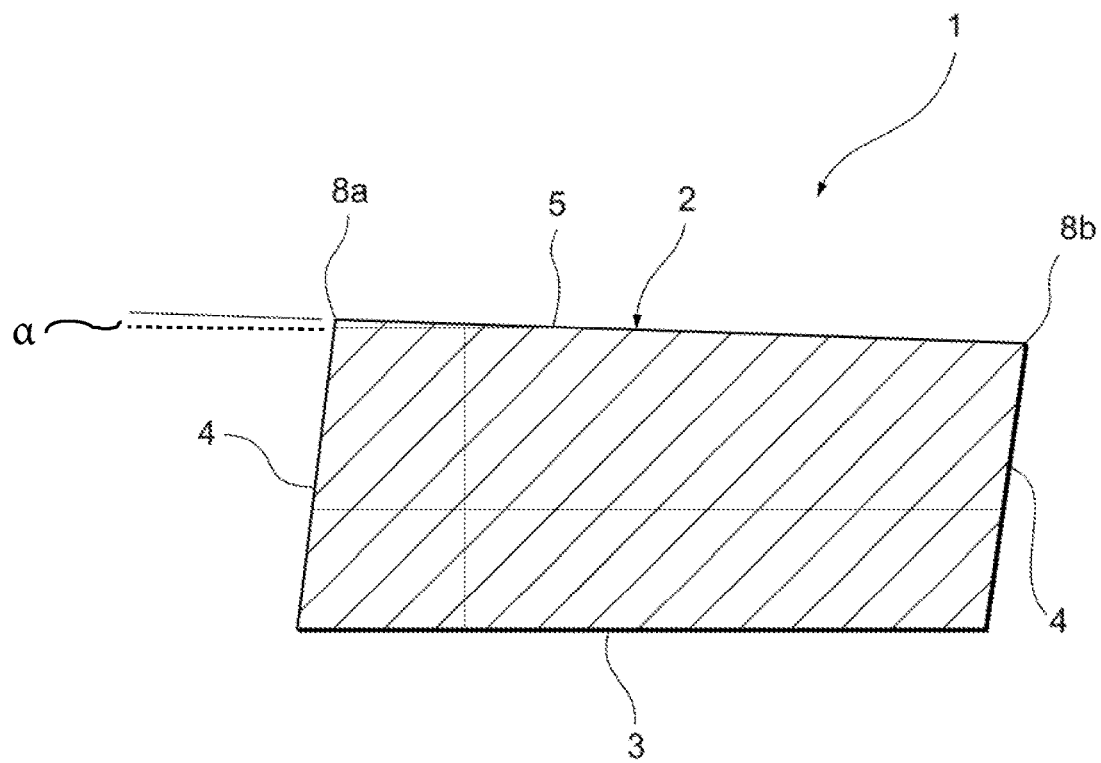
FIG. 5 is a cross-sectional view showing a V-V cross-section of FIG. 2.

FIG. 5 shows a cross-section which traverses the reference line L and also intersects with the two side edges 8a and 8b, and which is orthogonal to the second end surface 3. The rake surface 5 is inclined so as to gradually become closer to the second end surface 3, heading from the long side 8a to the long side 8b. Thus, in a cross-section parallel to the lateral plane (P2) and intersecting the two side edges (8a, 8b), a thickness of the insert decreases in a direction from one of the two side edges (8a, 8b) to the other of the two side edges (8b, 8a). And as seen in the FIG. 5 cross-section intersecting the two side edges 8a, 8b, the rake surface 5 is inclined at a constant angle from one of the side edges to the other of the side edges. It should be noted that, as shown in FIG. 6, as viewed in a cross-section which includes the reference line L and which is orthogonal to the second end surface 3, the rake surface 5 is substantially parallel to the second end surface 3.

Figure 6:
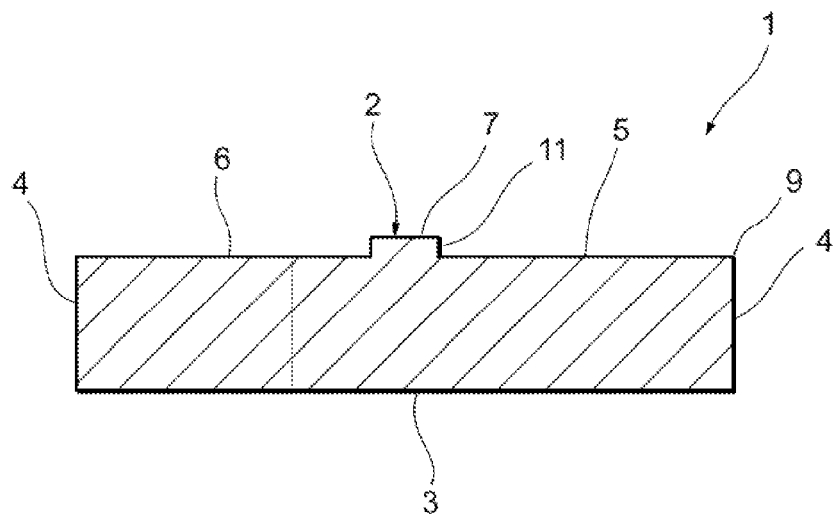
FIG. 6 is a cross-sectional view showing a VI-VI cross-section of FIG. 2.

As shown in FIG. 6, the rake surface 5 does not include a portion which is located at the same level as the contact surface 7 in the thickness direction of the cutting insert 1. Even the highest portion of the rake surface 5 is located at a lower level than the contact surface 7 (i.e., closer to the second end surface 3). Therefore, the connecting surface 11 is formed between the rake surface 5 and the contact surface 7. However, the present invention is not limited thereto, and the highest portion of the rake surface 5 may be located at the same level as the contact surface 7 or located at a higher level than the contact surface 7. Similarly, the lowest portion of the rake surface 5 may be located at the same level as the contact surface 7 or located at a higher level than the contact surface 7. Further, the first end surface 2 may be in the form of not having the contact surface 7. As described above, the minor rake surface 6 shares the same shape with the rake surface 5 and is arranged so as be in a shape of 180-degree rotational symmetry around the central axis O of the cutting insert 1 with respect to the rake surface 5. Therefore, the minor rake surface 6 is opposite to the rake surface 5 in terms of their respective inclination directions.

As shown in FIG. 5, assuming that an inclination angle of the rake surface 5 with respect to the second end surface 3 is α, such inclination angle α is approximately 3°. This inclination angle α is the same as a lead angle β of a helix at which the cutting insert 1 is mounted on a tool body 21. Therefore, this inclination angle α may be changed as appropriate in accordance with, for example, the shape of a gear to be machined.

Figure 7:
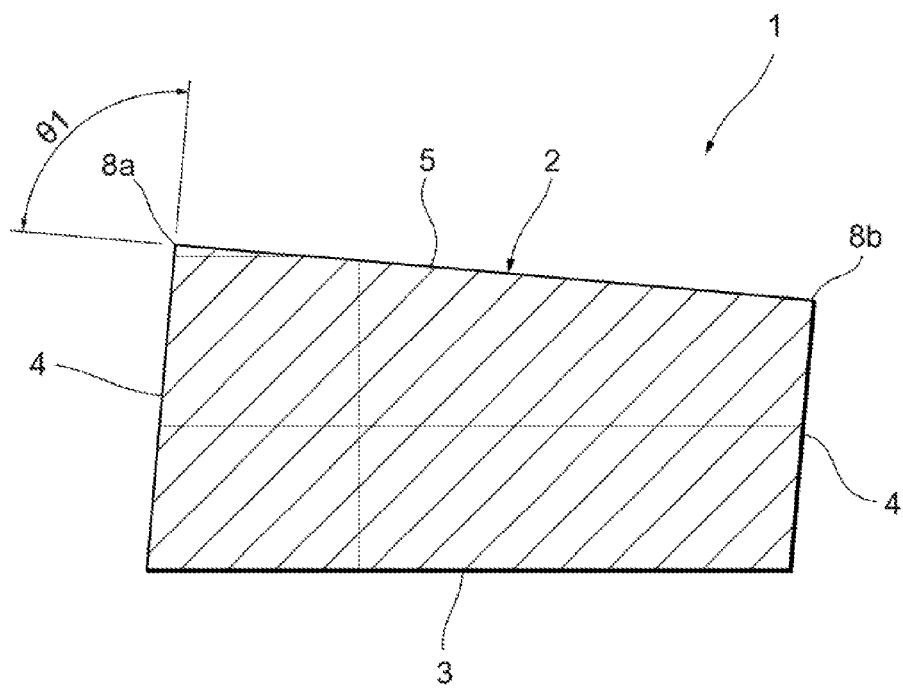
FIG. 7 is a cross-sectional view showing a VII-VII cross-section of FIG. 2.
Figure 8:
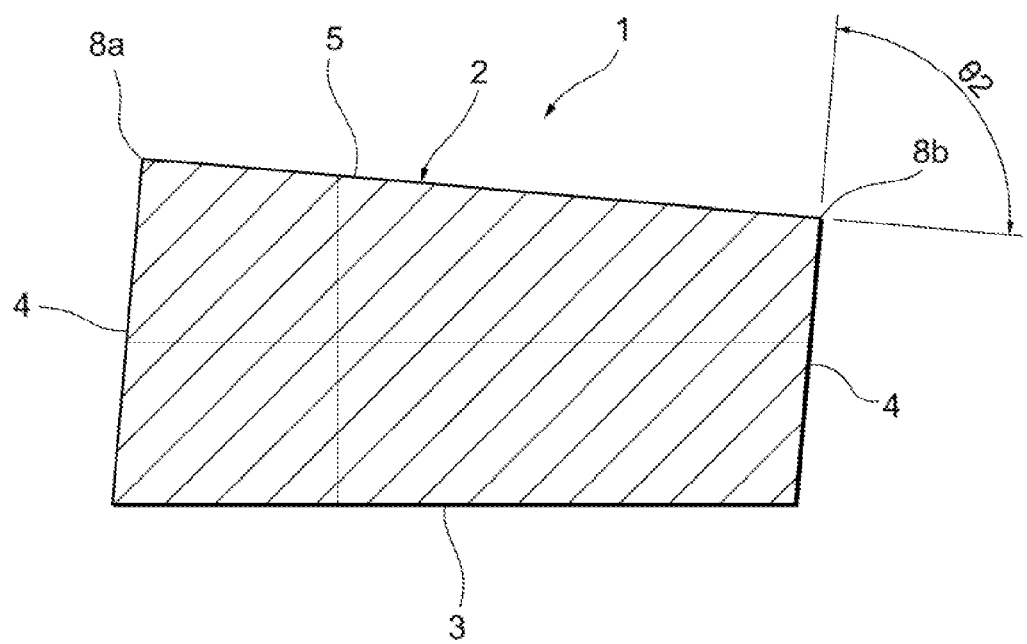
FIG. 8 is a cross-sectional view showing a VIII-VIII cross-section of FIG. 2.

FIG. 7 is a cross-sectional view showing a VII-VII cross-section of FIG. 2. The VII-VII cross-section is a plane which intersects with the first side edge 8a and the second end surface 3 in a perpendicular manner. As shown in FIG. 7, an interior angle formed by the rake surface 5 and the peripheral side surface 4 is an angle θ1. FIG. 8 is a cross-sectional view showing a VIII-VIII cross-section of FIG. 2. The VIII-VIII cross-section is a plane which intersects with the second side edge 8b and the second end surface 3 in a perpendicular manner. As shown in FIG. 8, an interior angle formed by the rake surface 5 and the peripheral side surface 4 is an angle θ2. The angles θ1 and θ2 are each 90°. The peripheral side surface 4 intersects, in a perpendicular manner, with the entire area of the rake surface 5, i.e., all of the following components, the two long sides 8a, the one short side 9 and the connecting parts 10 which connect such sides. Therefore, in the peripheral side surface 4, portions of the rake surface 5 which are connected to the two long sides 8 are inclined in the same direction. The peripheral side surface 4 is connected also to the minor rake surface 6 in the same way as the rake surface 5.

In the cutting insert 1, the peripheral side surface 4 is connected to the rake surface 5 and the minor rake surface 6 in this way. Therefore, as shown in FIG. 2, when the cutting insert 1 is viewed from a direction of a normal of the first end surface 2, in the peripheral side surface 4 connected to the rake surface 5, a portion thereof which is connected to the first side edge 8a can be seen. In the peripheral side surface 4, portions thereof connected to the contact surface 7 each connect a portion thereof which is connected to the rake surface 5 and a portion thereof which is connected to the minor rake surface 6. The portion thereof which is connected to the rake surface 5 and the portion thereof which is connected to the minor rake surface 6 extend on the same plane, and an edge appears in an intersection between such portions.

The intersecting edge between the rake surface 5 and the peripheral side surface 4 functions as the cutting edge 12. Similarly, the intersecting edge between the minor rake surface 6 and the peripheral side surface 4 functions as the cutting edge 12. The long sides 8a, the short side 9 and the curved connecting portions 10, which connect such sides of each of the rake surface 5 and the minor rake surface 6, all function as the cutting edge 12. The cutting insert 1 is a 2-corner-used type in which the cutting edge 12 on the rake surface 5 side and the cutting edge 12 on the minor rake surface 6 side can be reversed so as to be used by rotating the cutting insert 1 by 180 degrees around the central axis O. In the peripheral side surface 4, portions thereof connected to the above cutting edges 12 function as flanks. The second end surface 3 functions as a seating surface which comes into contact with a bottom surface 32 of an insert mounting part 31 described below. Further, the contact surface 7 functions as a portion with which a wedge member 41 for fixing the cutting insert 1 comes into contact. The wedge member 41 may be secured via a screw passing through the wedge member's upper surface 40.

Materials used for the cutting edges 12 of the cutting insert 1 and their peripheral areas may be hard materials or materials obtained by applying a coating of CVD, PVD, etc., to hard materials. As to such hard materials, cemented carbide, cermet, ceramic, a sintered body containing cubic boron nitride, a sintered body containing diamond and mono-crystalline diamond can be used. Materials for the portions other than the peripheral areas of the cutting edges 12 are preferably the same hard materials as those described above.

Next, a hob 20 on which the cutting insert 1 is mounted will be described with reference to FIGS. 9 to 15. The hob 20 is a cutting tool for forming the teeth of a gear.

Figure 9:
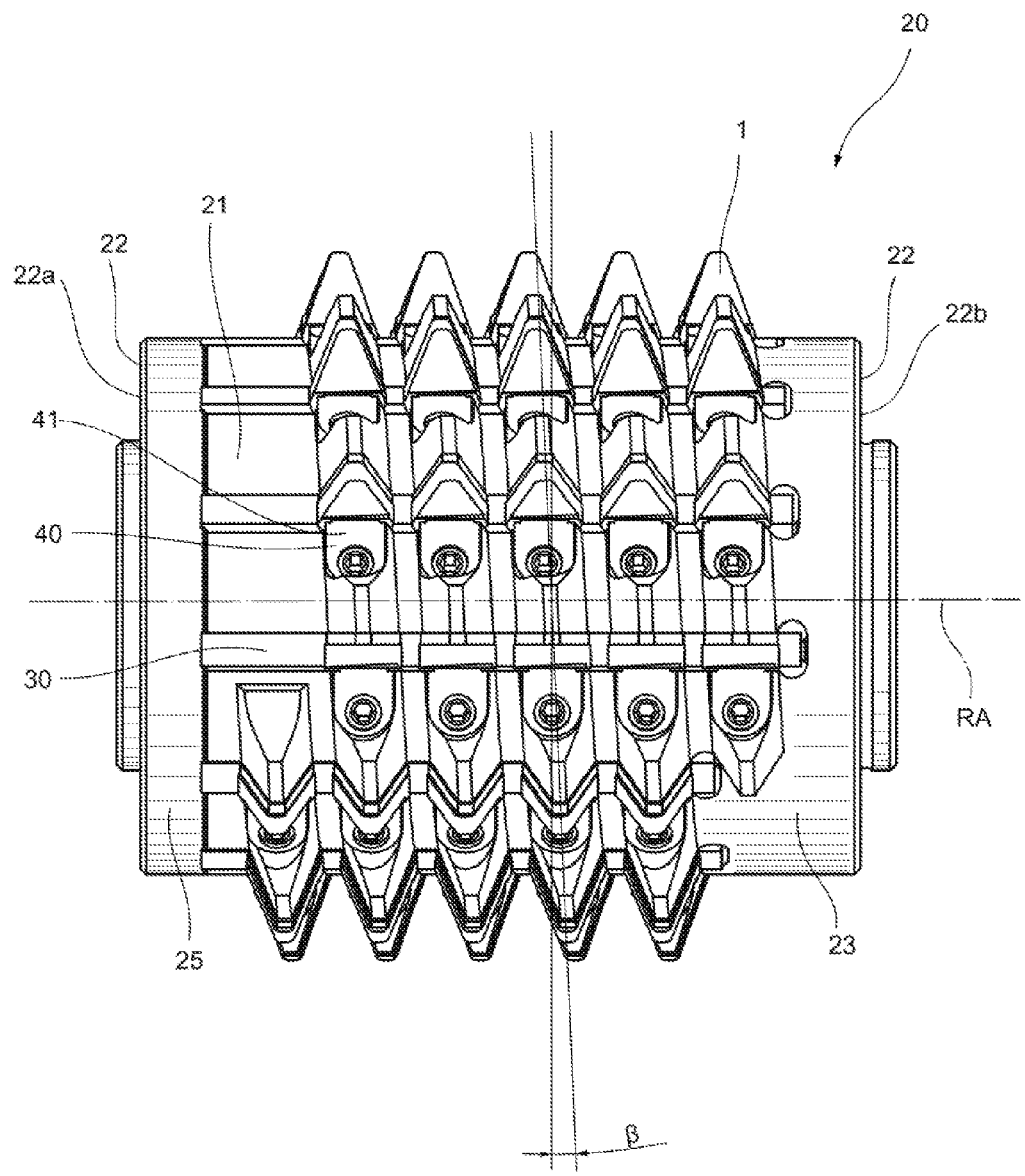
FIG. 9 is a plan view showing a cutting tool according to the first embodiment.
Figure 10:
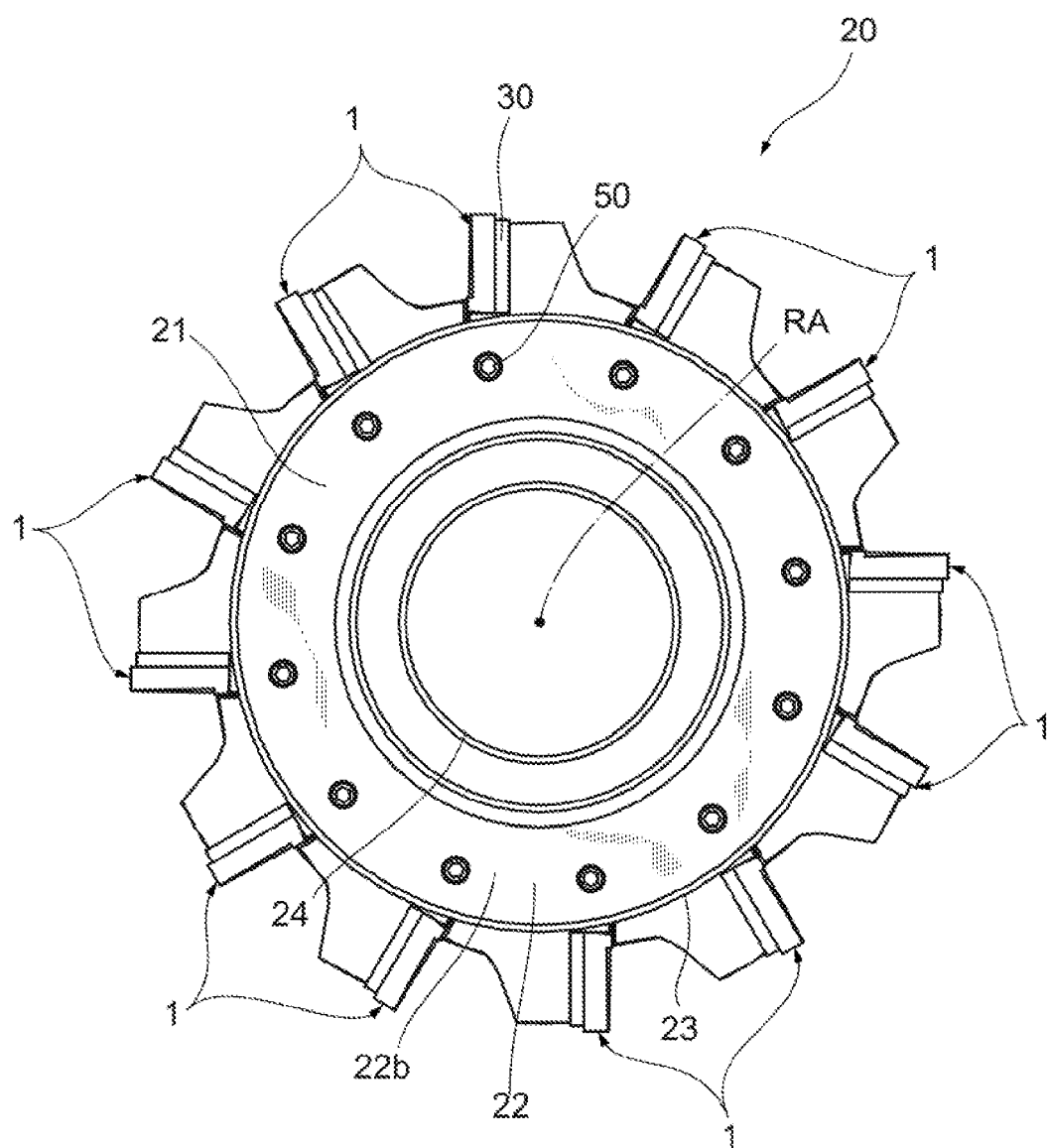
FIG. 10 is a right side view showing the cutting tool of FIG. 9.
Figure 11:
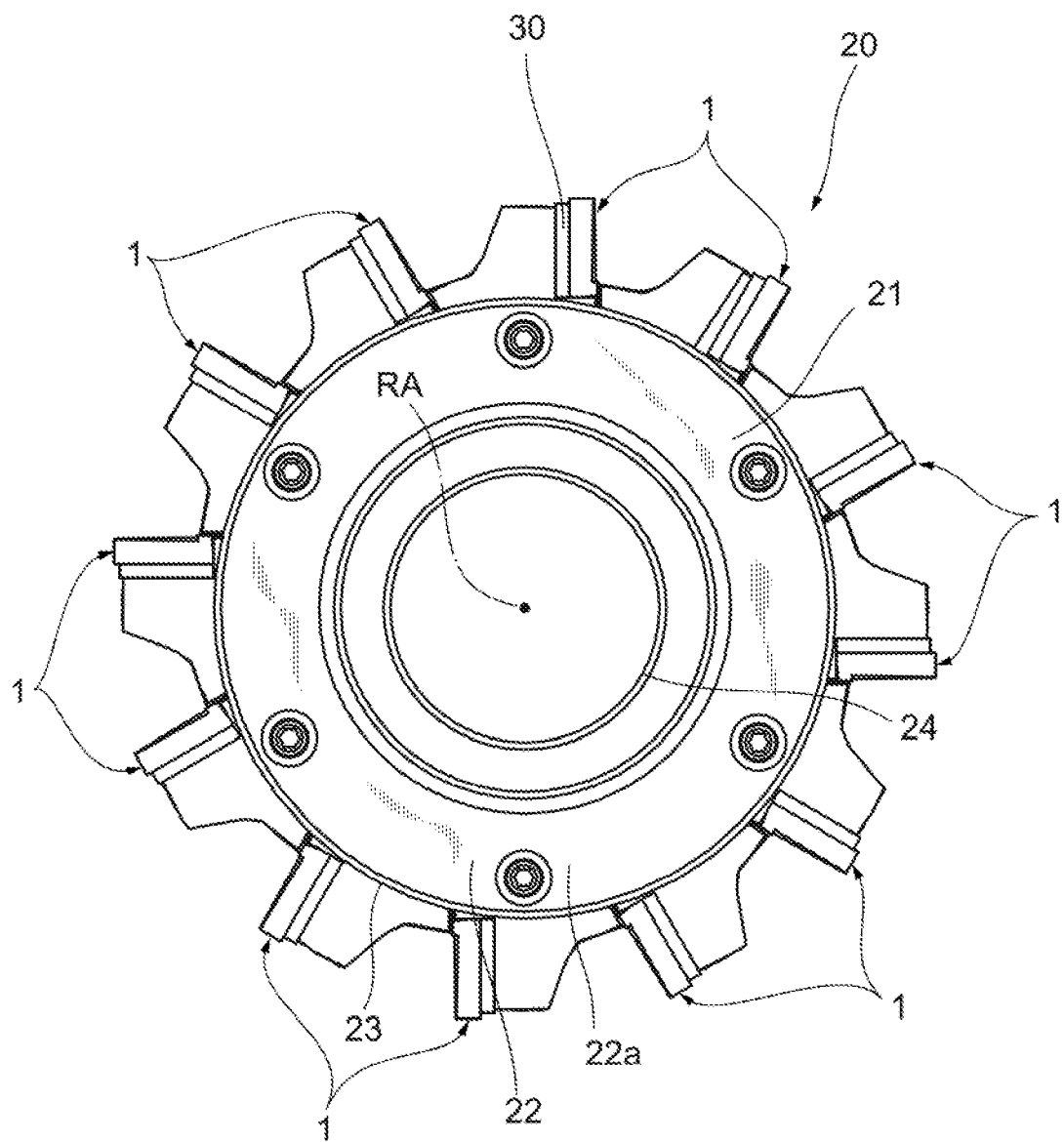
FIG. 11 is a left side view showing the cutting tool of FIG. 9.

As shown in FIGS. 9 to 11, the hob 20 comprises the tool body 21 on which a plurality of cutting inserts 1 is mounted. The tool body 21 has a substantially cylindrical shape around the rotational axis RA.

Figure 12:
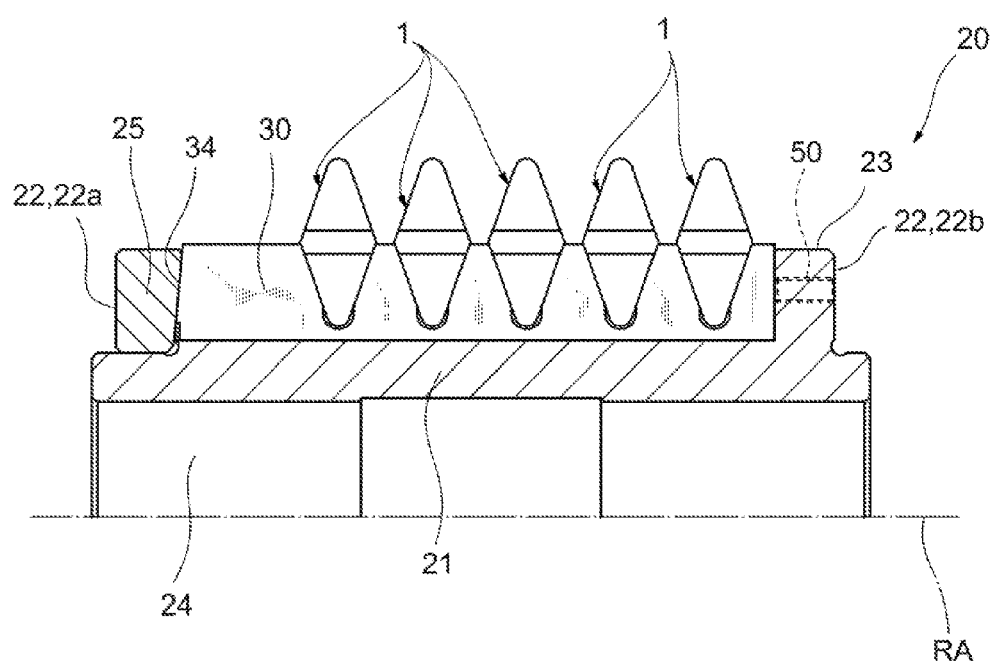
FIG. 12 is a cross-sectional view showing the cutting tool of FIG. 9.

FIG. 12 is a cross-sectional view obtained by partially cutting the hob 20 in a plane including the rotational axis RA. A ring member 25 is fixed to the tool body 21 by means of six bolts. The tool body 21 is constituted by two substantially circular end surfaces 22 which are opposed to each other and a peripheral side surface 23 which connects the end surfaces 22. The tool body 21 is further provided with a mounting hole 24 which penetrates the two end surfaces 22.

Figure 13:
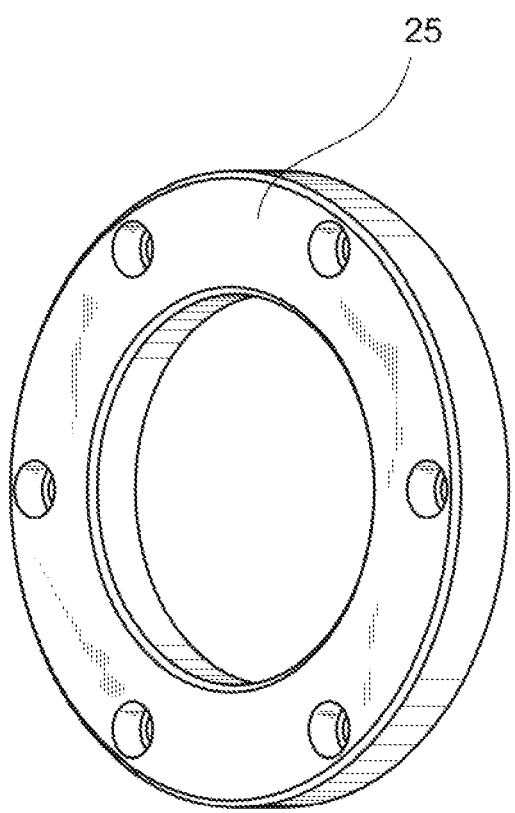
FIG. 13 is a perspective view showing a ring member of FIG. 9.

FIG. 13 is a perspective view of the ring member 25. The tool body 21 is separable from the ring member 25, but the present invention is not limited thereto. As to the structure of the tool body, the ring member 25 may not be used.

Figure 14:
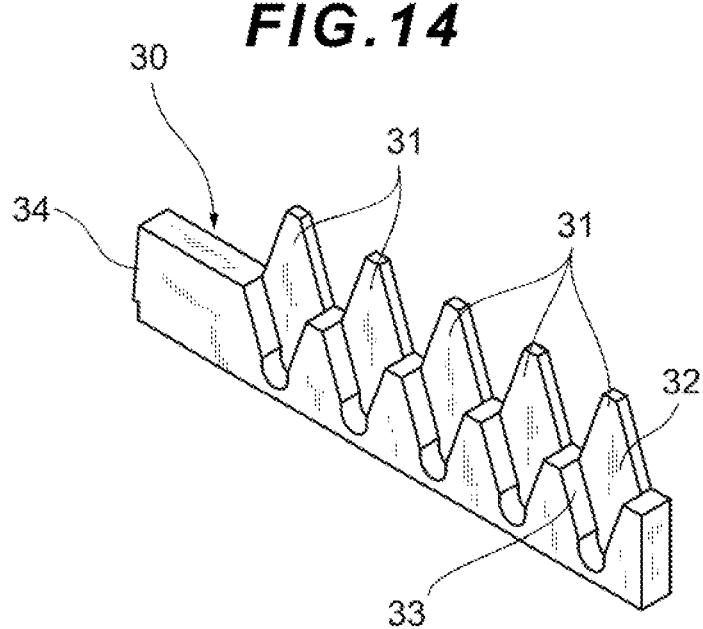
FIG. 14 is a perspective view showing a plate member of FIG. 9.
Figure 15:
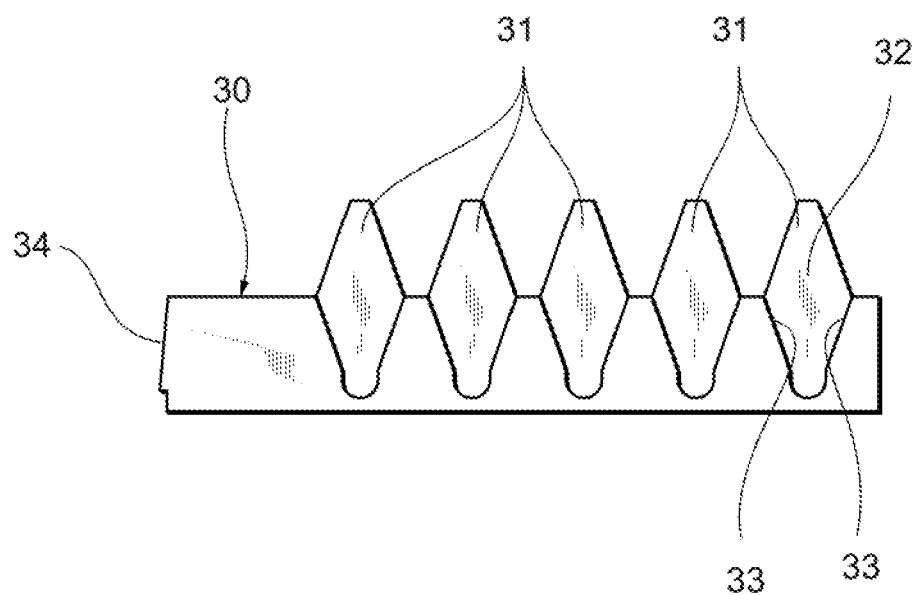
FIG. 15 is a front view showing the plate member of FIG. 14.

As shown in FIGS. 10 and 11, twelve plate members 30 are mounted on the peripheral side surface 23 of the tool body 21. As shown in FIGS. 14 and 15, each plate member 30 has a substantially rectangular parallelepiped shape in its entity. Further, the plate member 30 is provided with a plurality of insert mounting parts 31 so as to allow the plurality of cutting inserts 1 to be mounted thereon. Each insert mounting part 31 has a notch shape.

As shown in FIG. 12, a fastening screw 50 is used when mounting the plate member 30 on the tool body 21. The fastening screw 50 presses the plate member 30 from a second end surface 22b, being one of the end surfaces 22 of the tool body 21, toward the ring member 25. The ring member 25 has a conical tapered side surface 34. The shape of an end surface of the plate member 30 corresponds to the tapered side surface 34. The tapered side surface 34 of the ring member 25 comes into contact with such end surface of the plate member 30. Thus, the plate member 30 is firmly fixed by the ring member 25 even when a centrifugal force is applied thereto along with the rotation of the hob 20. The length of the plate member 30 allows the plurality of cutting inserts 1 to be placed in line. The hob 20 comprises the ring member 25 so as to have it be separable from the hob 20, in order to make it easy to provide the conical tapered side surface 34. The ring member 25 has a first end surface 22a, being the other end surface of the tool body 21.

As shown in FIGS. 14 and 15, the insert mounting parts 31 having the same shape are formed on one end surface of the plate member 30. The insert mounting parts 31 are arranged in line along the longitudinal direction of the plate member 30. It should be noted that, as to each plate member 30, the positions at which the insert mounting parts 31 are arranged are shifted in the longitudinal direction in units of a plate member 30. In further detail, when each plate member 30 is fixed to the tool body 21, the insert mounting parts 31 are arranged so as to define a helix reference line with a constant lead angle. The depth of the insert mounting part 31 is substantially equal to the maximum thickness of the cutting insert 1 or is slightly smaller than such maximum thickness.

The insert mounting part 31 has the bottom surface 32 and side wall surfaces 33. The bottom surface 32 has a shape corresponding to the contour shape of the cutting insert 1. The side wall surfaces 33 are arranged so as to intersect with the bottom surface 32. The bottom surface 32 is a flat surface which is substantially parallel to an end surface which opposes the end surface of the plate member 30 on which the insert mounting part 31 is arranged. The plurality of insert mounting parts 31 is arranged in the plate member 30 such that the bottom surfaces 32 thereof are arranged in the same direction.

The number of the insert mounting parts 31 formed in one plate member 30 is five. The plate member 30 having such shape is mounted on a predetermined position on the peripheral side surface 23 of the tool body 21 such that the bottom surface 32 of the insert mounting part 31 faces forward in a rotating direction. Further, the plate member 30 is fixed by a fixing member such as the fastening screw 50. Each plate member 30 is fixed so as to be substantially parallel to the rotational axis RA of the tool body 21. Therefore, the bottom surfaces 32 of all the insert mounting parts 31 are arranged so as to be substantially parallel to the rotational axis RA of the tool body 21. It should be noted that, although the hob 20 has the plate members 30, the present invention is not limited thereto. In the present invention, plate members may not be used, and insert mounting parts may be formed in an integrated manner with a tool body.

After the second end surface 3 is brought into contact with the bottom surface 32 of the insert mounting part 31, the cutting insert 1 is mounted on the tool body 21 by way of the wedge member 41, as shown in FIG. 9. The wedge member 41 comes into contact with and presses only the contact surface 7 of the cutting insert 1. Further, in the mounted cutting insert 1, the rake surface 5 or the minor rake surface 6 is projected from the plate member 30 and the tool body 21. The cutting edge 12 which is formed in such projected rake surface 5 or minor rake surface 6 is involved in cutting. For the purposes of simplifying the description, description will be made below regarding the case where the rake surface 5 and its cutting edge 12 are involved in cutting. The same applies to the case where the minor rake surface 6 and its cutting edge 12 are involved in cutting, and thus, the description thereof will be omitted here, except where particularly necessary.

As shown in FIGS. 10 and 11, the twelve plate members 30 are mounted on the tool body 21 at certain intervals in a circumferential direction thereof. Further, as shown in FIG. 9, the twelve plate members 30 are arranged such that the positions of the insert mounting parts 31 are shifted, heading from one of the end surfaces, i.e., the end surface 22a, to the other end surface, i.e., the end surface 22b, in a direction of the rotational axis RA of the tool body 21. The amount of shifting concerning the positions of the insert mounting parts 31 in the direction of the rotational axis RA is constant between adjacent plate members 30.

The cutting inserts 1 are arranged in a helical manner at a constant angle on the peripheral side surface 23 of the tool body 21. The helical line formed through the arrangement of the plurality of cutting inserts 1 can be referred to as a helix reference line. The helix reference line can also be referred to as a line indicating the lead direction of the helix. As shown in FIG. 9, the inclination angle β of the helix reference line relative to the line intersecting with the rotational axis RA of the tool body 21 in a perpendicular manner is referred to as a helix lead angle. The lead angle β defines a distance in which the helix leads, in the direction of the rotational axis RA, for one loop of the helix with respect to the tool body 21 in the circumferential direction thereof. This lead angle β is approximately 3°. The lead angle β may be changed as appropriate depending on the shape of a gear to be machined.

As described above, the rake surface 5 and the minor rake surface 6 of the cutting insert 1 are each given the inclination angle α of approximately 3°. This inclination angle α is the same as the helix lead angle β. Thus, when the second end surface 3 of the cutting insert 1 is brought into contact with the bottom surface 32 of the insert mounting part 31 such that the cutting insert 1 is mounted on the insert mounting part 31 (i.e., when the cutting insert 1 is mounted on the insert mounting part 31 such that the cutting edge 12 of the rake surface 5 is involved in cutting), the rake surface 5 intersects with the helix reference line in a substantially perpendicular manner.

Next, the operation and effects of the cutting insert 1 and the hob 20 on which such cutting insert 1 is mounted will be described.

The cutting insert 1 has the first end surface 2 and the second end surface 3 which are opposed to each other. The cutting insert 1 further has the peripheral side surface 4 which connects the first end surface 2 and the second end surface 3. As viewed from the direction facing the first end surface 2, the first end surface 2 has the at least one apex 9a and the two side edges 8a and 8b which extend so as to sandwich the apex 9a. At least respective parts of the two side edges 8a, 8b serve as the cutting edge 12. The first end surface 2 has the rake surface 5 which is connected to the cutting edge 12. As viewed in the cross-section which intersects with the two side edges 8a, 8b and which is orthogonal to the second end surface 3, the rake surface 5 is inclined relative to the second end surface 3. With such configuration, while the cutting inserts 1 are arranged so as to be substantially parallel to the rotational axis RA of the tool body 21, the rake surface 5 of each cutting insert 1 can be arranged so as to be substantially perpendicular to the helix reference line (the lead direction of the helix). In the hob 20, while the rake surface 5 is arranged so as to be substantially perpendicular to the helix reference line, a column of the cutting inserts 1 can be arranged so as to be substantially parallel to the rotational axis RA. As a result, in any of the cutting inserts 1, the contour shape of the cutting edge 12 in the rotational trajectory substantially matches an ideal formed shape.

If the plate member 30 is inclined relative to the rotational axis RA, the cutting insert 1 which is arranged closer to an end of the plate member 30 is located farther away from the rotational axis RA of the tool body 21 than the cutting insert 1 arranged closer to the center part of the plate member 30. This is because, in the plate member 30, the insert mounting parts 31 having the same shape are placed in line. Therefore, adjustment needs to be made such that the angle of arrangement, etc., of the cutting insert 1 arranged closer to the above end is different from the angle of arrangement, etc., of the cutting insert 1 arranged closer to the above center part. Without such adjustment, the accuracy of the teeth which are to be formed may be reduced.

Meanwhile, as for the cutting inserts 1 according to the present embodiment, the plate member 30 is arranged so as to be substantially parallel to the rotational axis RA, as described above. Therefore, the distance from the rotational axis RA of the tool body 21 to each cutting insert 1 is constant. As a result, the accuracy of the teeth which are to be formed can be improved significantly without the adjustment of an angle of arrangement, etc.

A mounting part for the plate member 30 is arranged so as to be substantially parallel to the rotational axis RA of the tool body 21. Thus, without rotating the tool body 21, a mounting part for a plate member for one line can be formed at once. Therefore, a high-rigidity cutting tool, such as a side cutter, can be used for cutting, in place of, for example, an end mill. Further, a high-rigidity inexpensive machine tool can be used for cutting without using an expensive low-rigidity apparatus, such as a 5-axis machining center which allows for angle control of a tool axis. Moreover, the number of control axes which allow for angle adjustment is reduced by one, and this can lead to increased accuracy of the machining position.

In the cutting insert 1, the rake surface 5 is adjacent to the minor rake surface 6 having a shape of 180-degree rotational symmetry about the central axis O with respect to the rake surface 5. The contact surface 7, which is a flat surface substantially parallel to the second end surface 3, is provided between the rake surface 5 and the minor rake surface 6. Therefore, two sets of the cutting edges 12 can be used, which is economical.

Further, the second end surface 3 entirely comprises a flat surface. The second end surface 3 functions as a seating surface which comes into contact with the bottom surface 32 of the insert mounting part 31. Thus, the cutting insert 1 can be fixed in a secure manner.

Further, the cutting edge 12 has the short side 9, the long sides 8 and the connecting parts 10. The short side 9 is arranged in the apex 9a. The long sides 8 are respectively arranged in the two side edges 8a, 8b. The two connecting parts 10 respectively connect the short side 9 and the respective long sides 8. However, the present invention is not limited thereto.

The rake surface 5 is inclined so as to be rotated around the above-described bisector L serving as the central axis. However, the present invention is not limited thereto. The rake surface 5 may be inclined based on a reference line defined separately from the above bisector L without departing from the gist of the present invention.

Further, the cutting tool according to the present embodiment is the hob 20 which is suitable for the machining of a gear, etc. However, the present invention is not limited thereto. The present invention may be broadly applied to a cutting tool in which cutting edges are arranged in a helical manner.

Figure 16:
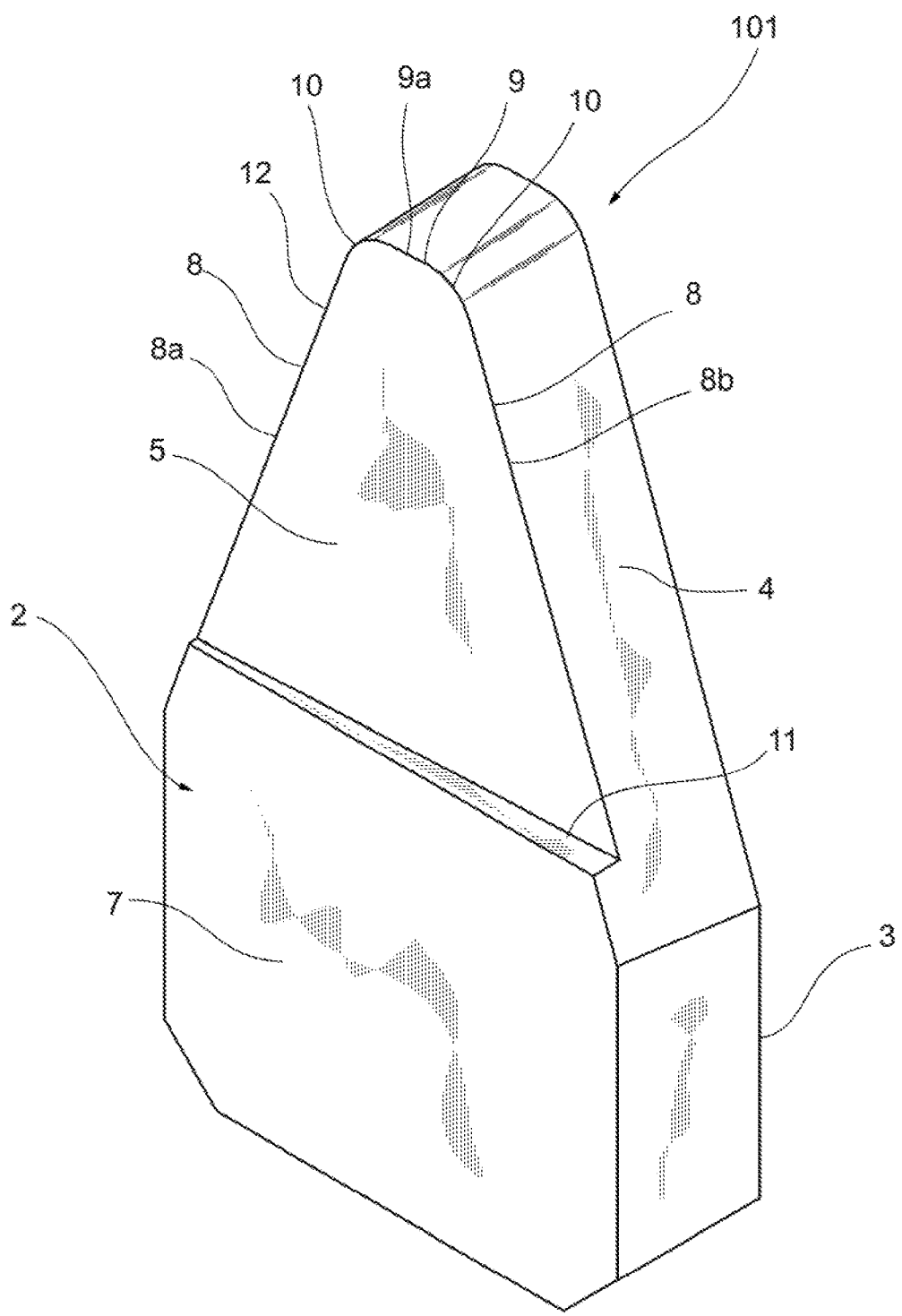
FIG. 16 is a perspective view showing a cutting insert according to a second embodiment.
Figure 17:
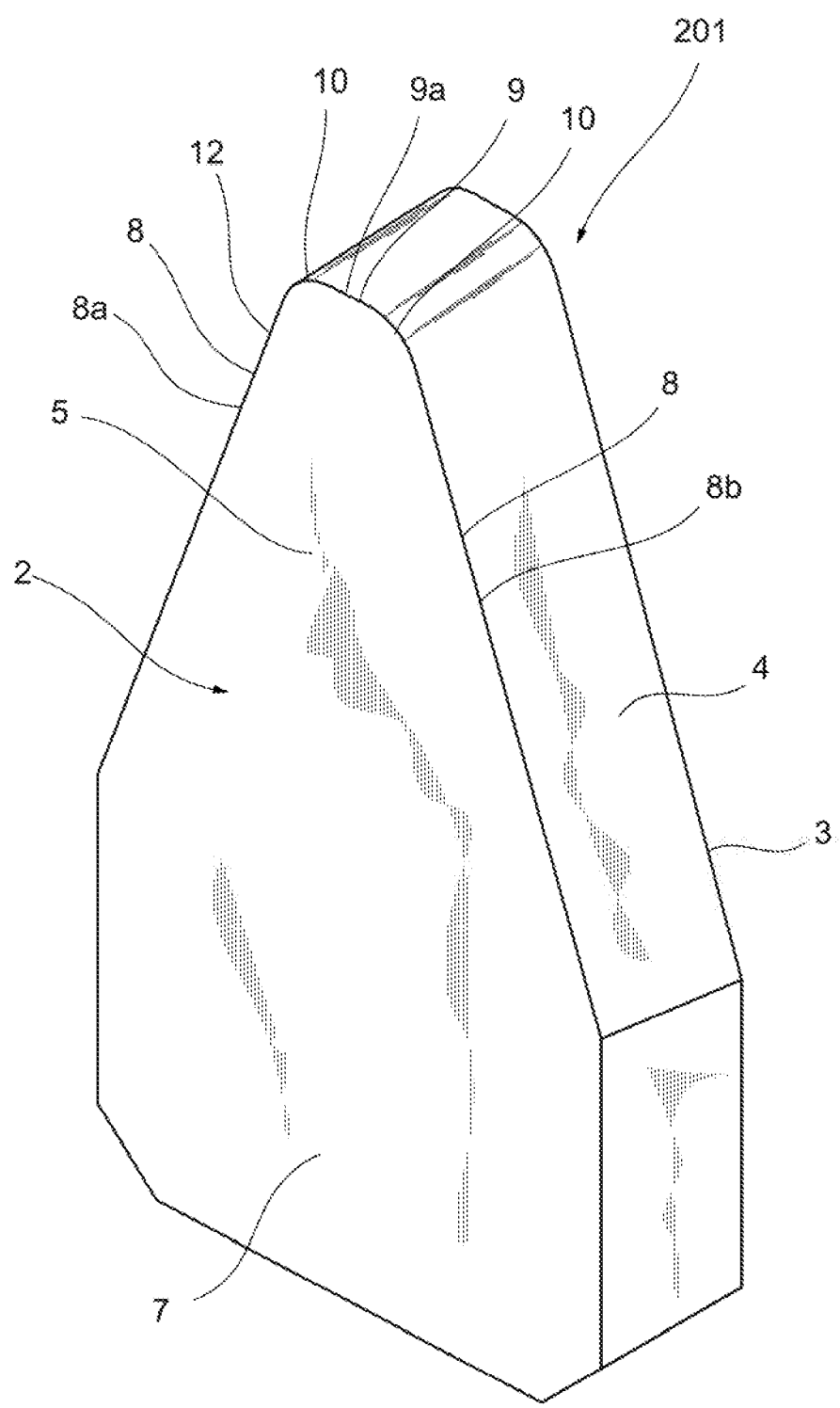
FIG. 17 is a perspective view showing a cutting insert according to a third embodiment.
Figure 18:
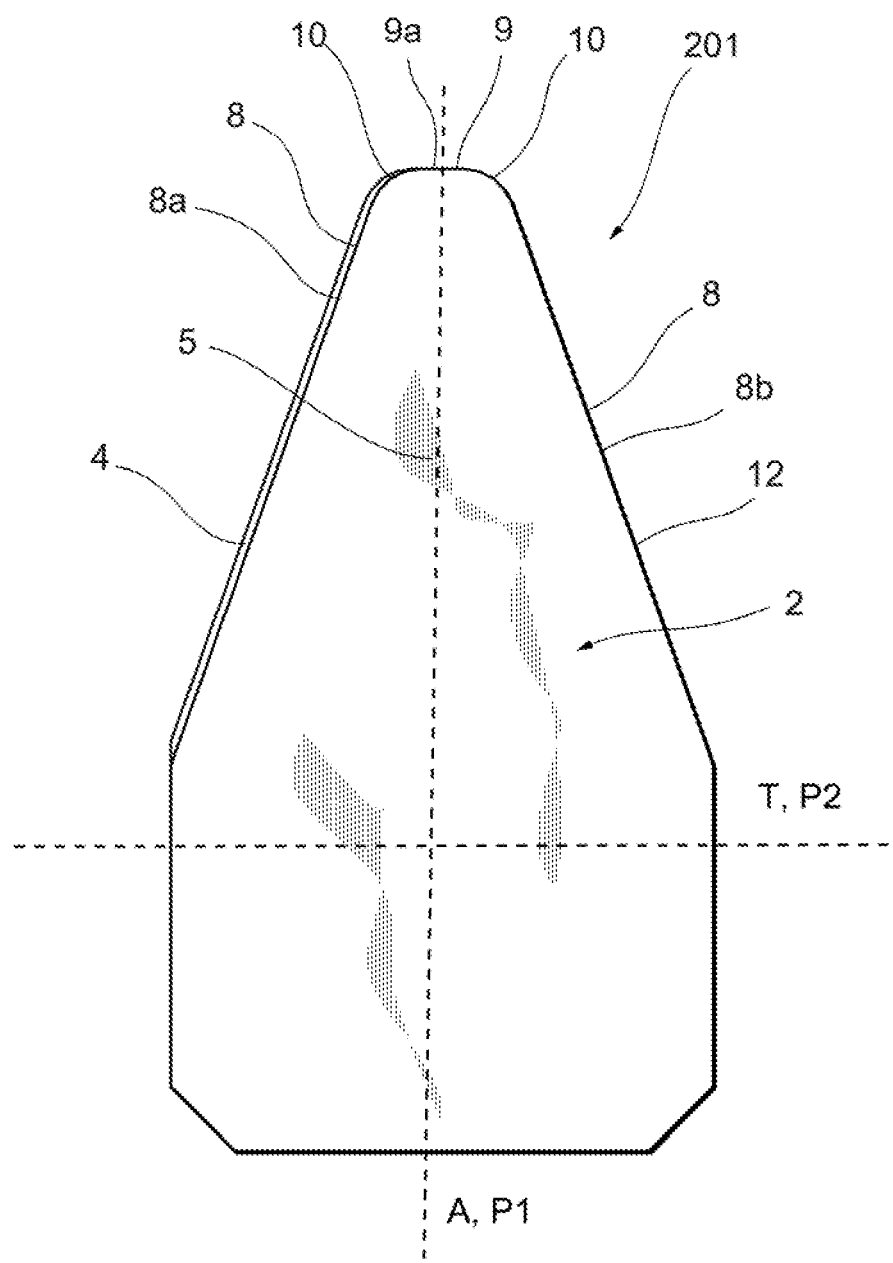
FIG. 18 is a plan view showing the cutting insert of FIG. 17.
Figure 19:
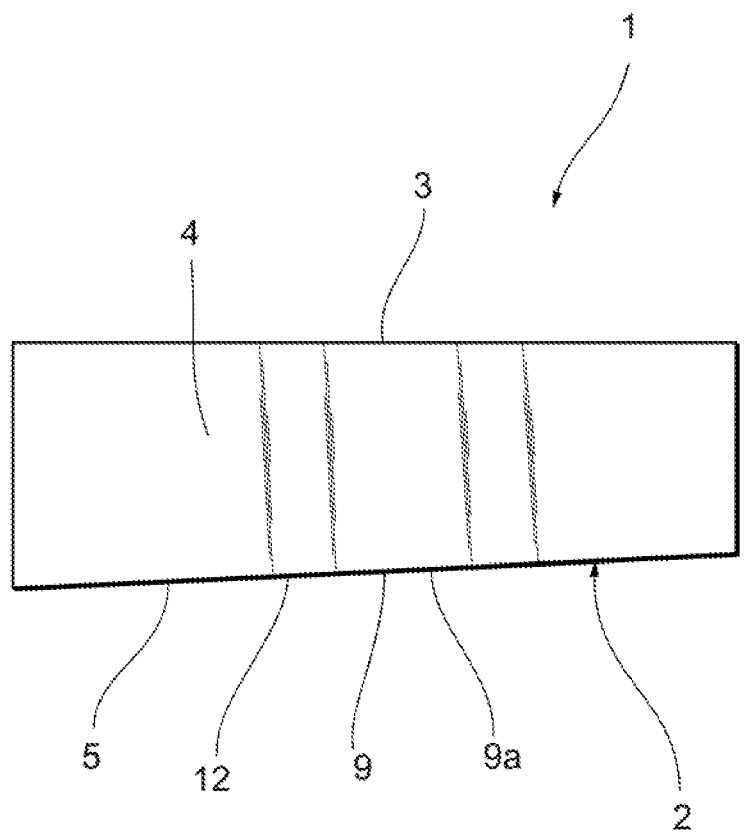
FIG. 19 is a back view showing the cutting insert of FIG. 17.
Figure 20:
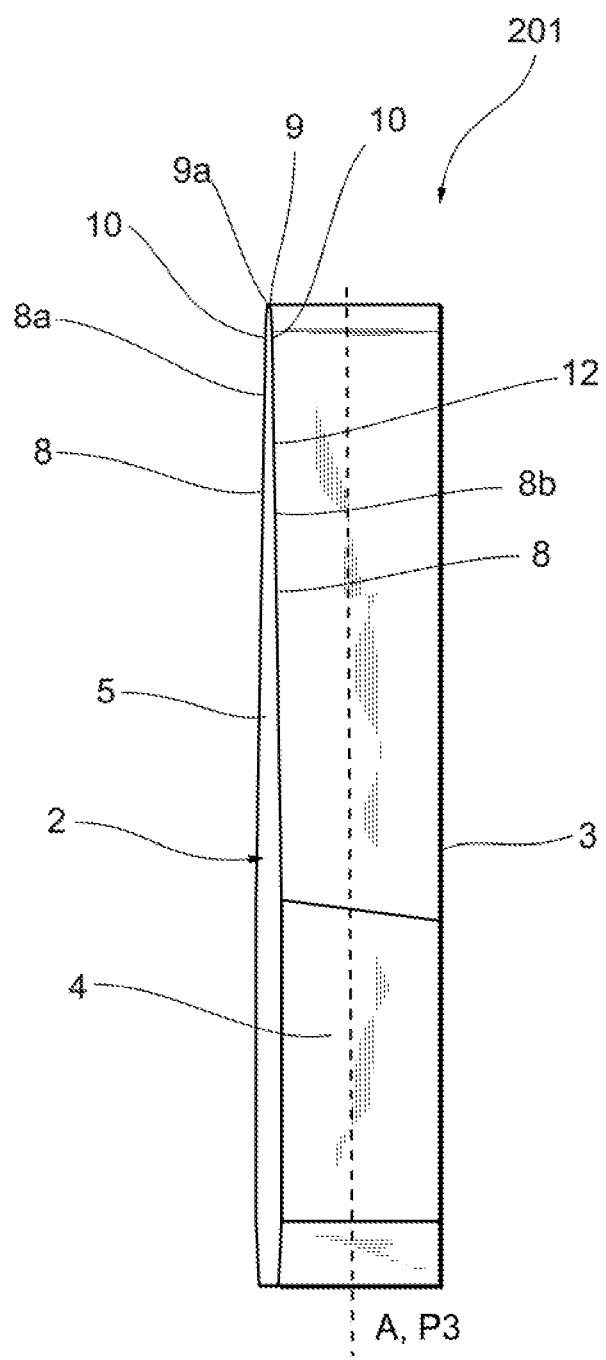
FIG. 20 is a right side view showing the cutting insert of FIG. 17.

Next, a cutting insert 101 according to a second embodiment will be described with reference to FIG. 16. The cutting insert 101 does not include the minor rake surface 6 according to the first embodiment. Therefore, the cutting insert 101 is a 1-corner-used type in which only the cutting edge of the rake surface 5 is usable. Further, in the cutting insert 101, the contact surface 7 is formed so as to be large for the absence of the minor rake surface 6. The contact surface 7 has a substantially quadrangular shape. However, the shape of the contact surface 7 is not limited to a substantially quadrangular shape. Further, in the peripheral side surface 4, the portions thereof which are connected to the contact surface 7 intersect with the contact surface 7 in a substantially perpendicular manner. The shapes of the portions other than the above portions are basically the same as those of the cutting insert 1 of the first embodiment, and thus, the description thereof will be omitted.

A cutting tool (not shown) on which the cutting insert 101 is mounted has a shape in which an insert mounting part of the cutting tool corresponds to the cutting insert 101. The shapes of the other portions are basically the same as those of the hob 20 according to the first embodiment, and thus, the description thereof will be omitted.

The cutting insert 101 does not include the minor rake surface 6. Thus, the longitudinal dimension of the cutting insert 101 can be made smaller than that of the cutting insert 1 according to the first embodiment. Therefore, the second embodiment can be used suitably in a small-sized cutting tool.

Next, a cutting insert 201 according to a third embodiment will be described with reference to FIGS. 17 to 20. The cutting insert 201 does not include the contact surface 7 according to the second embodiment. Further, the first end surface 2 is entirely configured by a flat surface obtained by extending the rake surface 5. The first end surface 2 including the rake surface 5 is entirely inclined relative to the second end surface 3. In this way, in the cutting insert 201, the first end surface 2 is entirely a flat surface obtained by extending the rake surface 5. In the first end surface 2, a portion thereof which functions as a cutting edge is the same as that of the cutting insert 101 according to the second embodiment. In other words, the long sides 8, the short side 9 and the connecting parts 10, which connect such sides, by themselves, of the cutting insert 201 function as the cutting edge 12. The intersecting edge other than such components does not function as a cutting edge. Further, as to the flat surface obtained by extending the rake surface 5, part thereof functions as a contact surface which comes into contact with a fixing member such as a wedge member. The contour shape of the cutting insert 201 is not limited to the one shown in the drawing and may be changed as appropriate.

A cutting tool (not shown) on which the cutting insert 201 is mounted has a shape in which an insert mounting part of the cutting tool corresponds to the shape of the cutting insert 201. A fixing member such as a wedge member also has a shape corresponding to the shape of the cutting insert 201. A pressure surface of the wedge member, etc., is inclined, corresponding to the rake surface 5 of the cutting insert 201. The pressure surface of the wedge member, etc., comes into contact with part of the flat surface obtained by extending the rake surface 5 of the cutting insert 201. The shapes of the other portions are the same as those of the hob 20 according to the first embodiment, and thus, the description thereof will be omitted.

In the cutting insert 201, the first end surface 2 is entirely a flat surface obtained by extending the rake surface 5. Thus, the cutting insert 201 does not include the major rake surface 6 and the contact surface 7 which is substantially parallel to the second end surface 3. The cutting insert 201 has an advantage wherein the longitudinal dimension thereof can be made smaller than that of the cutting insert 1 according to the first embodiment, in the same way as the cutting insert 101 according to the second embodiment. The cutting insert 201 has a further advantage wherein the first end surface 2, being one flat surface, facilitates manufacturing compared with the cutting insert 101 according to the second embodiment. Therefore, the third embodiment may be used suitably in a small-sized cutting tool.

Figure 21:
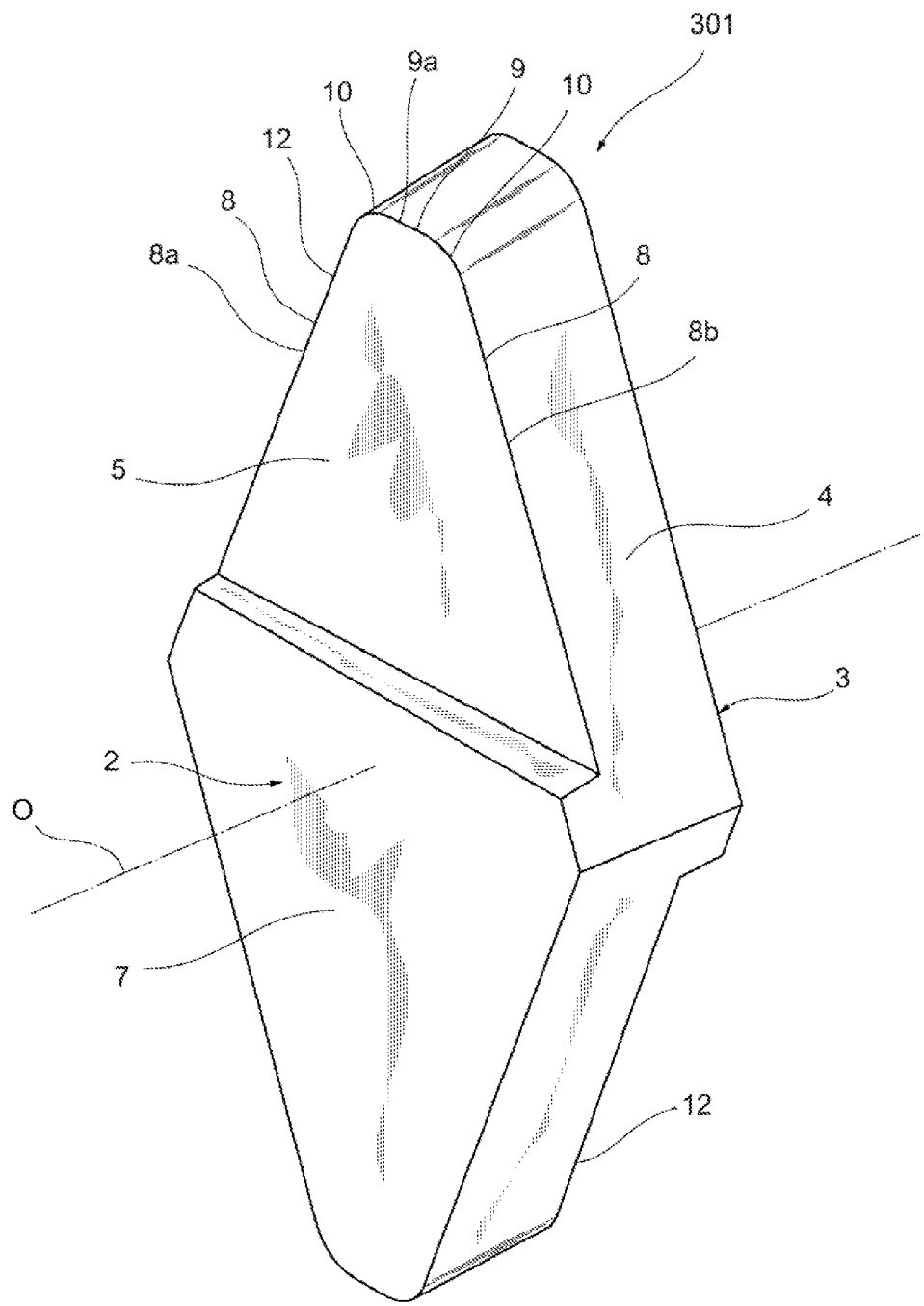
FIG. 21 is a perspective view showing a cutting insert according to a fourth embodiment.
Figure 22:
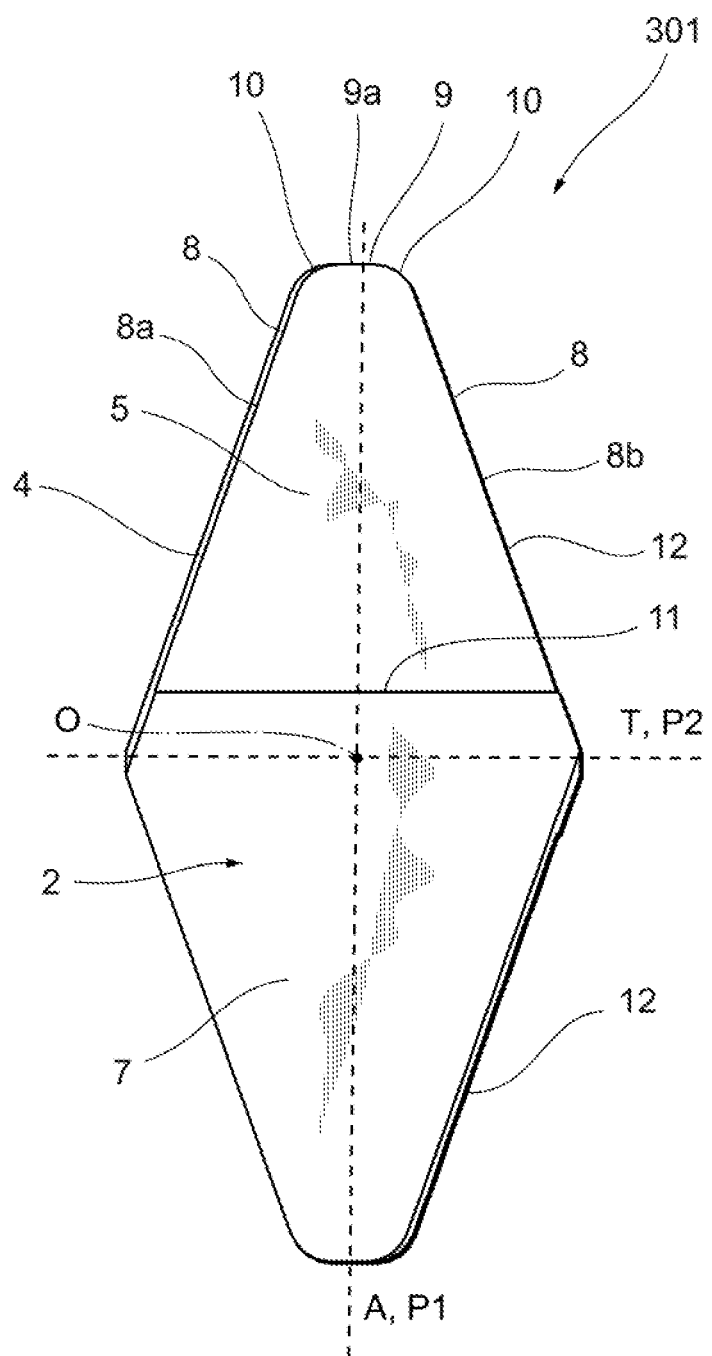
FIG. 22 is a plan view showing the cutting insert of FIG. 21.
Figure 23:
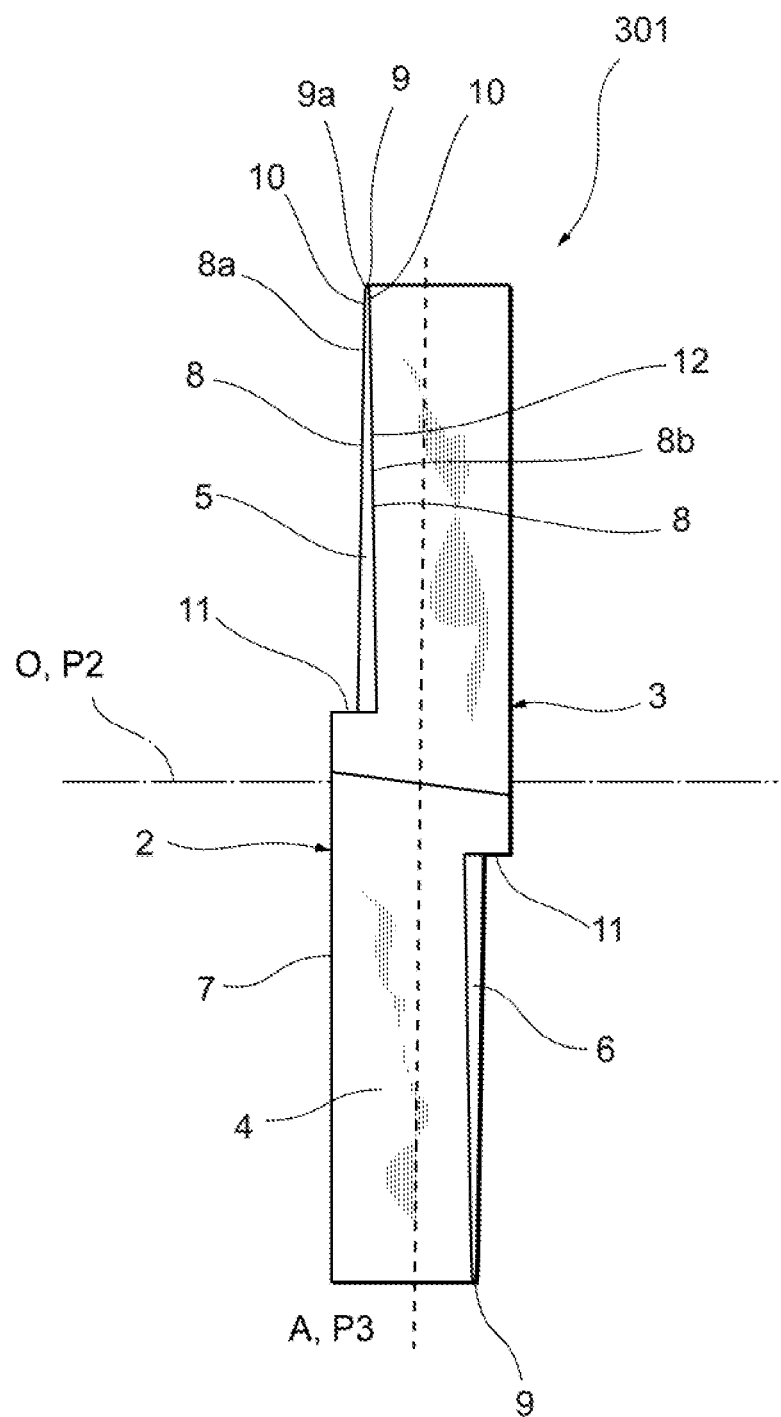
FIG. 23 is a right side view showing the cutting insert of FIG. 21.

Next, a cutting insert 301 according to a fourth embodiment will be described with reference to FIGS. 21 to 23. In the cutting insert 301, the rake surface 5, as in the first embodiment, is formed in one of the areas of the first end surface 2. However, the minor rake surface 6 in the first embodiment is not formed in the other area, and the contact surface 7 extends through the remaining area. Meanwhile, the second end surface 3 has a shape of 180-degree rotational symmetry around a reference line with respect to the first end surface 2. Such reference line is defined at a position which intersects with the central axis O in a perpendicular manner and which divides the cutting insert 201 into two equal parts in the longitudinal direction. Therefore, the cutting insert 301 is a 2-corner-used type in which the cutting edge 12 on the rake surface 5 side and the cutting edge 12 on the minor rake surface 6 side are switched so as to be used, as in the cutting insert 1 of the first embodiment. However, such type of the cutting insert 301 is used by switching the first end surface 2 and the second end surface 3. The shapes of the other portions are basically the same as those of the cutting insert of the first embodiment, and thus, the description thereof will be omitted.

A cutting tool (not shown) on which the cutting insert 301 is mounted has a shape in which an insert mounting part of the cutting tool corresponds to the cutting insert 301. The shapes of the other portions are the same as those of the hob 20 according to the first embodiment, and thus, the description thereof will be omitted.

In the cutting insert 301, when defining a reference line drawn at a position which intersects with the central axis O in a perpendicular manner and which divides the cutting insert 301 into two equal parts in the longitudinal direction, the second end surface 3 is provided with the minor rake surface 6 having a shape of 180-degree rotational symmetry around the reference line with respect to the rake surface 5. Therefore, the cutting insert 301 is economical since it has two usable cutting edges. Further, a stepped part 11, which is located between the rake surface 5 and the contact surface 7, is also arranged in the second end surface 3 having 180-degree rotational symmetry with respect to the first end surface 2. Thus, although it is not shown in the drawing, when an insert mounting part is provided with a stepped shape corresponding to the stepped part 11, the stepped part 11 can be utilized as a reference surface which determines a mounting posture of the cutting insert 301. In other words, the stepped part 11 can be brought into contact with the corresponding stepped shape of the insert mounting part. Thus, compared with the case in which only the peripheral side surface 4, being a reference surface which determines a fixing posture, is brought into contact with an insert mounting part, the posture of the cutting insert 301 can be adjusted in an accurate manner.

Figure 24:
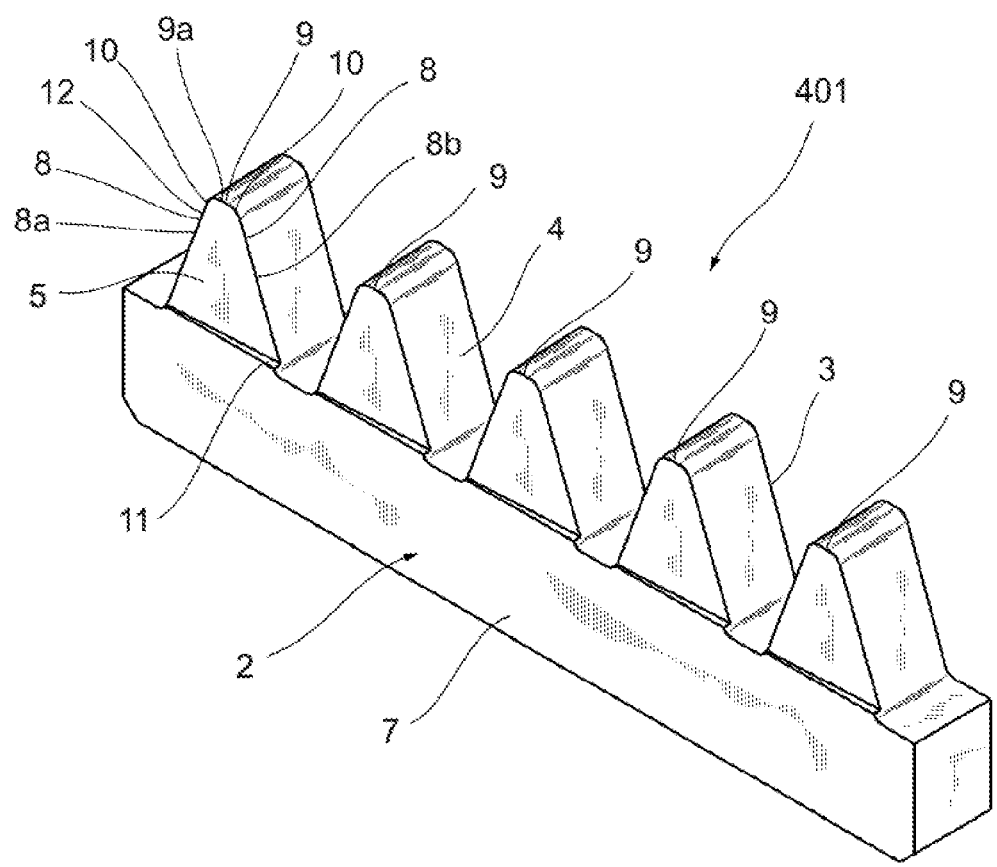
FIG. 24 is a perspective view showing a cutting insert according to a fifth embodiment.

Next, a cutting insert 401 according to a fifth embodiment will be described with reference to FIGS. 24 and 25. The cutting insert 401 is of a so-called blade type. The cutting insert 401 is formed such that a plurality of cutting edges 12 is placed in line in one outer side surface. The short sides 9 of the respective cutting edges 12 are also arranged so as to be placed in line.

The cutting insert 401 has the first end surface 2, the second end surface 3 and the peripheral side surface 4. The second end surface 3 is arranged so as to oppose the first end surface 2. The peripheral side surface 4 connects the first end surface 2 and the second end surface 3. The first end surface 2 is provided with five rake surfaces 5 each having a shape which is the same as that of the cutting insert 1 of the first embodiment. All the rake surfaces 5 share the same shape and are inclined in the same direction at the inclination angle α with respect to the second end surface 3. An intersecting edge between each rake surface 5 and the peripheral side surface 4 functions as each cutting edge 12. The peripheral side surface 4 functions as a flank. The second end surface 3 functions as a seating surface. Each portion of the peripheral side surface 4 which functions as a flank is connected to each rake surface 5 in a perpendicular manner, in the same way as the cutting insert 1 of the first embodiment.

Figure 25:
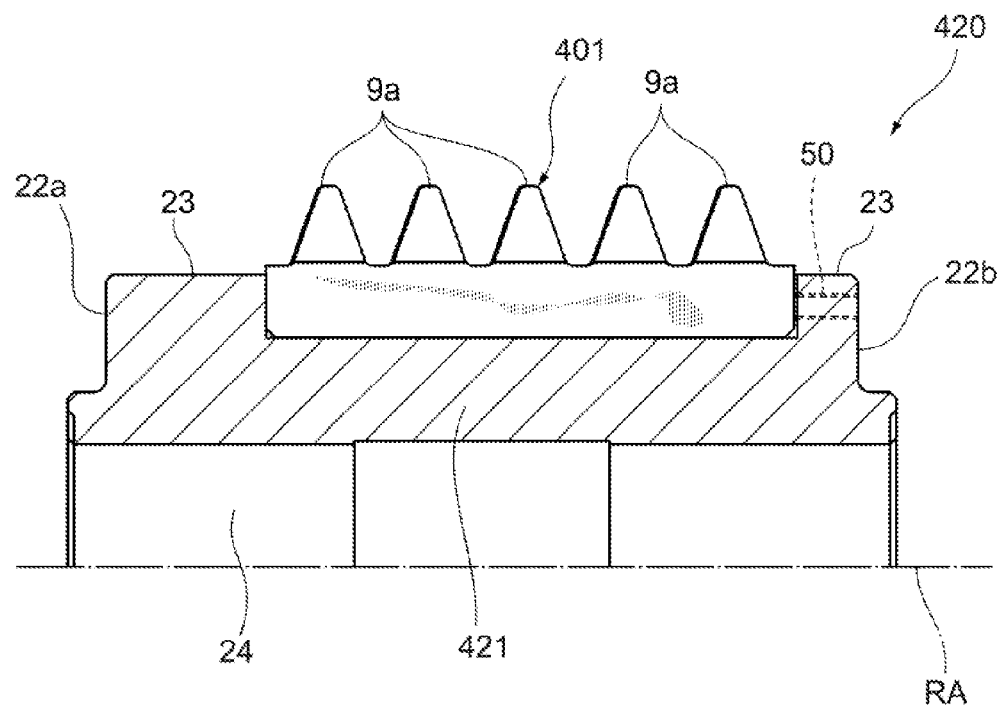
FIG. 25 is a cross-sectional view showing a cutting tool according to the fifth embodiment.

FIG. 25 shows a hob 420 on which the cutting insert 401 is mounted. The shape of an insert mounting part of the hob 420 corresponds to the shape of the cutting insert 401. However, it is unnecessary to mount the cutting insert 401 on a plate member. As shown in FIG. 25, this cutting insert 401 can be mounted directly on the hob 420 by being inserted into a recess which is provided, on the peripheral side surface 23 of a tool body 421, so as to be substantially parallel to the rotational axis RA. A plurality of cutting inserts 401 is provided on the peripheral side surface 23 of the tool body 421. The cutting inserts 401 are mounted such that apexes 9a thereof are arranged in a helical manner heading from one of the end surfaces, i.e. the end surface 22a of the tool body 421, to the other end surface, i.e., the end surface 22b thereof. In the hob 420, the rake surfaces 5 are arranged so as to be substantially perpendicular to the helix reference line in the same way as the hob 20 of the first embodiment. The other shapes are the same as those of the cutting tool of the first embodiment, and the description thereof will be omitted.

In the cutting insert 401, cutting edge parts for one line can be replaced at the same time. Therefore, this is advantageous when it is desired to reduce labor for the replacement of the cutting insert 401. Although not shown in the drawing, in the present embodiment, wedge members may not be respectively provided so as to be adjacent to all the cutting edges 12 and, for example, may be mounted on such cutting edges 12 in an alternating manner. A reduction in the number of wedge members would further be advantageous when it is desired to reduce labor for the replacement of the cutting insert 401.

Although representative embodiments of the present invention have been described above, various modifications may be made to the present invention, and any replacements and modifications thereof may be made without departing from the spirit and scope of the present invention defined in the scope of the claims of the present application.

What is claimed is:

1. A cutting insert comprising:
   a first end surface and a second end surface which are opposed to each other; and
   a peripheral side surface which connects the first end surface and the second end surface, wherein:
   as viewed from a direction facing the first end surface, the first end surface has at least one apex and two side edges which extend so as to sandwich the apex;
   at least part of the two side edges comprises a cutting edge;
   the first end surface has a rake surface connected to the cutting edge;
   as viewed in a cross-section which intersects with the two side edges and which is orthogonal to the second end surface, the rake surface is inclined relative to the second end surface; and
   as viewed from the direction facing the first end surface, when a bisector of an interior angle formed by respective extensions of the two side edges is defined,
   as viewed in a cross-section which includes the bisector and which is orthogonal to the second end surface, the rake surface is substantially parallel to the second end surface.

2. The cutting insert according to claim 1, wherein:
   the cutting edge has a short side arranged in the apex, a long side arranged in each of the two side edges and two connecting parts each of which connects the short side and the long side; and
   as viewed from the direction facing the first end surface, the cutting edge is arranged so as to be line symmetrical with respect to the bisector.

3. The cutting insert according to claim 1, wherein the first end surface has a contact surface which is parallel to the second end surface and which is substantially flat.

4. The cutting insert according to claim 3, wherein, when a central axis which penetrates the first end surface and the second end surface is defined,
   the first end surface has a minor rake surface which is arranged so as to be of 180-degree rotational symmetry about the central axis with respect to the rake surface, and
   the contact surface is provided between the rake surface and the minor rake surface.

5. The cutting insert according to claim 1, wherein the second end surface has a minor rake surface.

6. The cutting insert according to claim 1, wherein:
   the cutting edge has a short side arranged in the apex, a long side arranged in each of the two side edges and two connecting parts each of which connects the short side and the long side;
   all of the short sides are formed so as to be placed in line, thereby entirely forming a comb shape;
   a plurality of the rake surfaces is formed, corresponding to the short sides; and
   all of the rake surfaces are inclined in a same direction.

7. A cutting tool comprising:
   the cutting insert according to claim 6; and
   a tool body, wherein:
   the tool body has a substantially cylindrical shape having two substantially circular end surfaces and a peripheral side surface which connects the end surfaces;
   a plurality of the apexes of a plurality of the cutting inserts is arranged in a helical manner on the peripheral side surface of the tool body, heading from one of the end surfaces to the other end surface;
   a longitudinal direction of the cutting insert is arranged so as to be substantially parallel to a rotational axis (RA) serving as a rotation center of the tool body (421); and
   an inclination angle of each of the rake surfaces of the cutting insert is the same as a lead angle of a helix formed by a plurality of the apexes.

8. The cutting insert according to claim 1, wherein:
   in said cross-section intersecting with the two side edges, the rake surface is inclined at a constant angle from one of said side edges to the other of the said side edges.

9. The cutting tool according to claim 8, configured as a hob for machining a gear.

10. A cutting tool comprising
    the cutting insert according to claim 1; and
    a tool body, wherein:
    the tool body has a substantially cylindrical shape having two substantially circular end surfaces and a peripheral side surface which connects the end surfaces;
    a plurality of the cutting inserts is mounted, on the peripheral side surface of the tool body, so as to be arranged in a helical manner, heading from one of the end surfaces to the other end surface;
    in a side view, the cutting insert is placed so as to be substantially parallel to a rotational axis serving as a rotation center of the tool body; and
    an inclination angle of the rake surface of the cutting insert is the same as a lead angle of a helix formed by a plurality of the cutting inserts.

11. A cutting insert comprising:
a first end surface and a second end surface which are opposed to each other; and
a peripheral side surface which connects the first end surface and the second end surface, wherein:
as viewed from a direction facing the first end surface, the first end surface has at least one apex and two side edges which extend so as to sandwich the apex;
at least part of the two side edges comprises a cutting edge;
the first end surface has a rake surface connected to the cutting edge;
as viewed in a cross-section which intersects with the two side edges and which is orthogonal to the second end surface, the rake surface is inclined relative to the second end surface; and
the first end surface including the rake surface is entirely inclined relative to the second end surface.

12. A cutting insert comprising:
a first end surface and a second end surface which are opposed to each other; and
a peripheral side surface which connects the first end surface and the second end surface;
a longitudinal axis extending along a longest dimension of the insert and lying on a longitudinal plane which is perpendicular to the second end surface; and
a transverse axis extending along widest dimension of the insert and lies on a lateral plane which is also perpendicular to the second end surface, the transverse axis intersecting the longitudinal axis at a right angle and being perpendicular to the longitudinal plane, the intersection of the longitudinal axis and the transverse axis defining a third plane which is parallel to the second end surface wherein:
as viewed from a direction facing the first end surface, the first end surface has at least one apex and two side edges which extend so as to sandwich the apex;
the longitudinal plane intersects the at least one apex;
at least one of the two side edges comprises a cutting edge;
the first end surface has a rake surface connected to the cutting edge; and
in a cross-section parallel to the lateral plane and intersecting the two side edges, a thickness of the insert decreases in a direction from one of the two side edges to the other of the two side edges.

13. The cutting insert according to claim 12, wherein:
in said cross-section intersecting with the two side edges, the thickness of the insert decreases at a constant angle.

14. The cutting insert according to claim 13, wherein:
in said cross-section intersecting with the two side edges, the thickness of the insert decreases at a constant angle of 3 degrees.

15. The cutting insert according to claim 12, wherein:
the cutting edge has a short side arranged in the apex, a long side arranged in each of the two side edges and two connecting parts each of which connects the short side and the long side.

16. A cutting tool comprising:
a tool body having a substantially cylindrical shape having two substantially circular end surfaces and a peripheral side surface which connects the end surfaces, the tool body having a rotational axis serving as a rotation center of the tool body; and
a plurality of cutting inserts according to claim 12, mounted on the peripheral side surface.

17. The cutting tool according to claim 16, further comprising:
a plurality of plate members mounted on the peripheral side surface, each plate member being provided with a plurality of insert mounting parts; wherein:
each of said plurality of cutting inserts is mounted in an insert mounting part of one of the plate members; and
the plate members and cutting inserts are mounted such that the cutting inserts are arranged in a helical manner, heading from one of the end surfaces to the other end surface.

18. The cutting tool according to claim 17, wherein:
in a side view, each cutting insert is placed so as to be substantially parallel to the rotational axis of the tool body; and
an inclination angle of the rake surface of each cutting insert is the same as a lead angle of a helix formed by a plurality of the cutting inserts.

19. The cutting tool according to claim 17, wherein:
each cutting insert's cutting edge has a short side arranged in the apex, a long side arranged in each of the two side edges and two connecting parts each of which connects the short side and the long side;
in a given plate member, the cutting inserts are mounted such that all of the short sides are in line, thereby forming a comb shape; and
rake surfaces associated with the short sides are all are inclined in a same direction.

* * * * *